(12) United States Patent
Saidman

(10) Patent No.: US 11,986,780 B2
(45) Date of Patent: May 21, 2024

(54) HOT MELT ADHESIVE FOAM DISPENSING SYSTEM

(71) Applicant: NORDSON CORPORATION, Westlake, OH (US)

(72) Inventor: Laurence B. Saidman, Duluth, GA (US)

(73) Assignee: Nordson Corporation, Westlake, OH (US)

(*) Notice: Subject to any disclaimer, the term of this patent is extended or adjusted under 35 U.S.C. 154(b) by 339 days.

(21) Appl. No.: 17/429,001

(22) PCT Filed: Mar. 13, 2020

(86) PCT No.: PCT/US2020/022634
§ 371 (c)(1),
(2) Date: Aug. 6, 2021

(87) PCT Pub. No.: WO2020/190721
PCT Pub. Date: Sep. 24, 2020

(65) Prior Publication Data
US 2022/0105480 A1    Apr. 7, 2022

Related U.S. Application Data

(60) Provisional application No. 62/819,119, filed on Mar. 15, 2019.

(51) Int. Cl.
*B01F 23/23*    (2022.01)
*B01F 23/235*   (2022.01)
(Continued)

(52) U.S. Cl.
CPC ......... *B01F 23/235* (2022.01); *B05B 12/006* (2013.01); *B05B 12/10* (2013.01);
(Continued)

(58) Field of Classification Search
CPC ...... B01F 23/235; B01F 25/62; B05B 12/006; B05B 12/10; B05B 7/0025; B29C 44/348;
(Continued)

(56) References Cited

U.S. PATENT DOCUMENTS 4,437,581 A * 3/1984 Coker .................... B05B 12/10
                                                        222/54
4,778,631 A * 10/1988 Cobbs, Jr. ............... B29B 7/481
                                                        261/92
(Continued)

FOREIGN PATENT DOCUMENTS

CN    109195714 A    1/2019

OTHER PUBLICATIONS

ISA/220—Notification of Transmittal or Search Report and Written Opinion of the ISA237, or the Declaration dated Jul. 9, 2020 for WO Application No. PCT/US20/022634.

*Primary Examiner* — Vishal Pancholi
(74) *Attorney, Agent, or Firm* — BakerHostetler

(57) ABSTRACT

A dispensing system for dispensing a hot melt adhesive foam onto a substrate is described. The dispensing system comprises a pump having a first input to receive a hot melt adhesive and a second input to receive a gas, where the pump mixes the hot melt adhesive and the gas to produce a solution. The dispensing system also includes a temperature sensor to detect a temperature of the solution, a dispenser to receive the solution from the pump and dispense the solution, and a controller. The controller instructs the pump to operate at a first speed, receives the temperature of the solution, and instructs the pump to operate at a second speed that is different than the first speed in response to the signal.

20 Claims, 15 Drawing Sheets

(51) Int. Cl.
*B05B 12/00* (2018.01)
*B05B 12/10* (2006.01)
*B29C 44/34* (2006.01)
*B29C 44/60* (2006.01)
*B01F 25/62* (2022.01)
*B05B 7/00* (2006.01)
*B29C 44/46* (2006.01)
*G01F 15/02* (2006.01)

(52) U.S. Cl.
CPC ............ *B29C 44/348* (2013.01); *B29C 44/60* (2013.01); *B01F 25/62* (2022.01); *B05B 7/0025* (2013.01); *B29C 44/3442* (2013.01); *B29C 44/461* (2013.01); *G01F 15/02* (2013.01)

(58) Field of Classification Search
CPC ... B29C 44/60; B29C 44/3442; B29C 44/461; G01F 15/02

USPC ..... 222/1, 52, 63, 133, 190, 135, 145.5, 318
See application file for complete search history.

(56) References Cited

U.S. PATENT DOCUMENTS

| | | | | |
|---|---|---|---|---|
| 4,779,762 | A * | 10/1988 | Klein | B05B 12/085 422/111 |
| 4,938,381 | A * | 7/1990 | Mandeville | B29B 7/7461 222/146.2 |
| 5,271,521 | A * | 12/1993 | Noss | B29B 7/826 222/146.2 |
| 5,332,125 | A | 7/1994 | Schmitkons et al. | |
| 7,677,414 | B2 * | 3/2010 | Hidaka | B05B 12/1427 222/145.5 |
| 2014/0014683 | A1 * | 1/2014 | Owen | B05C 11/1044 222/54 |

* cited by examiner

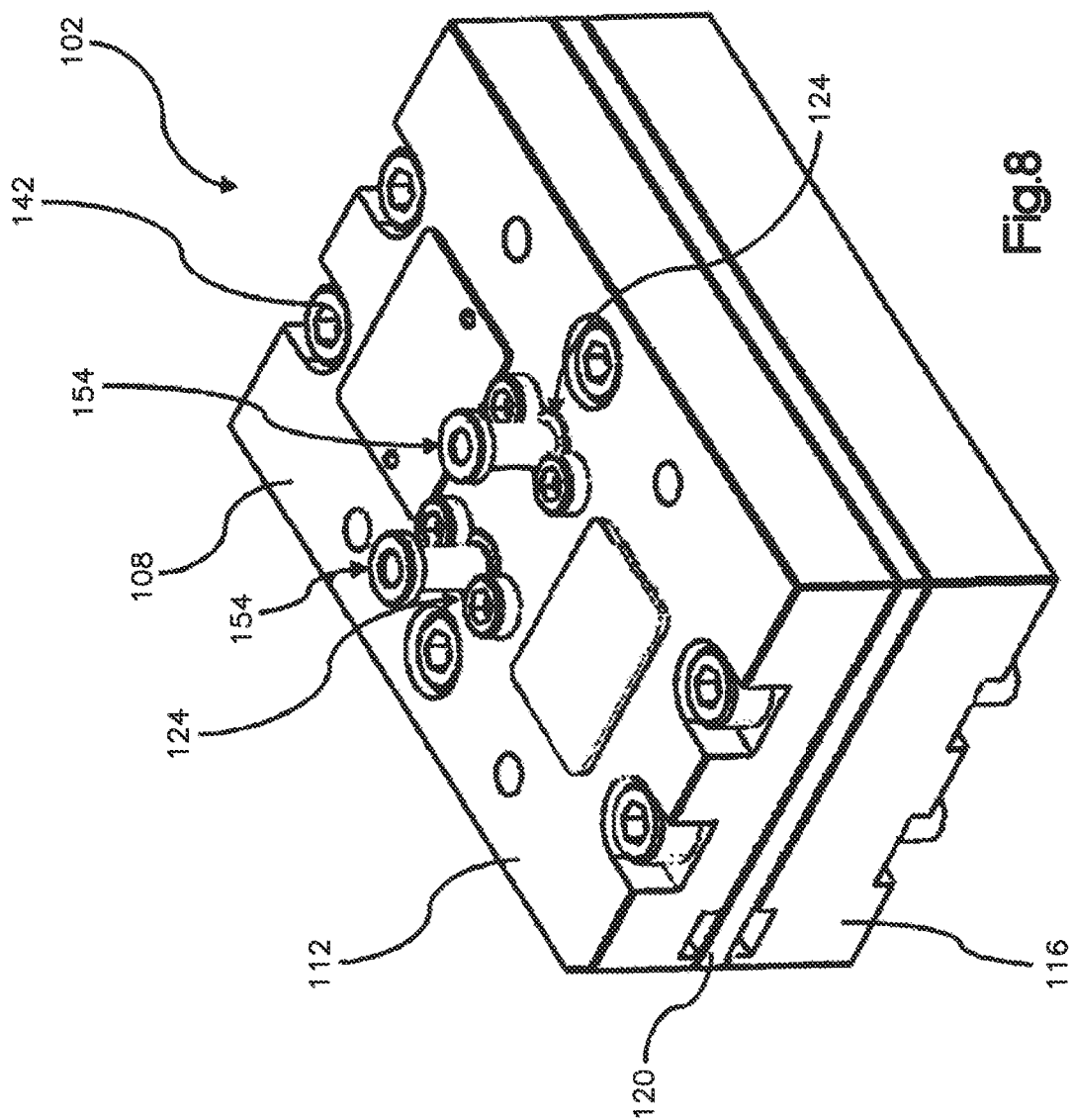

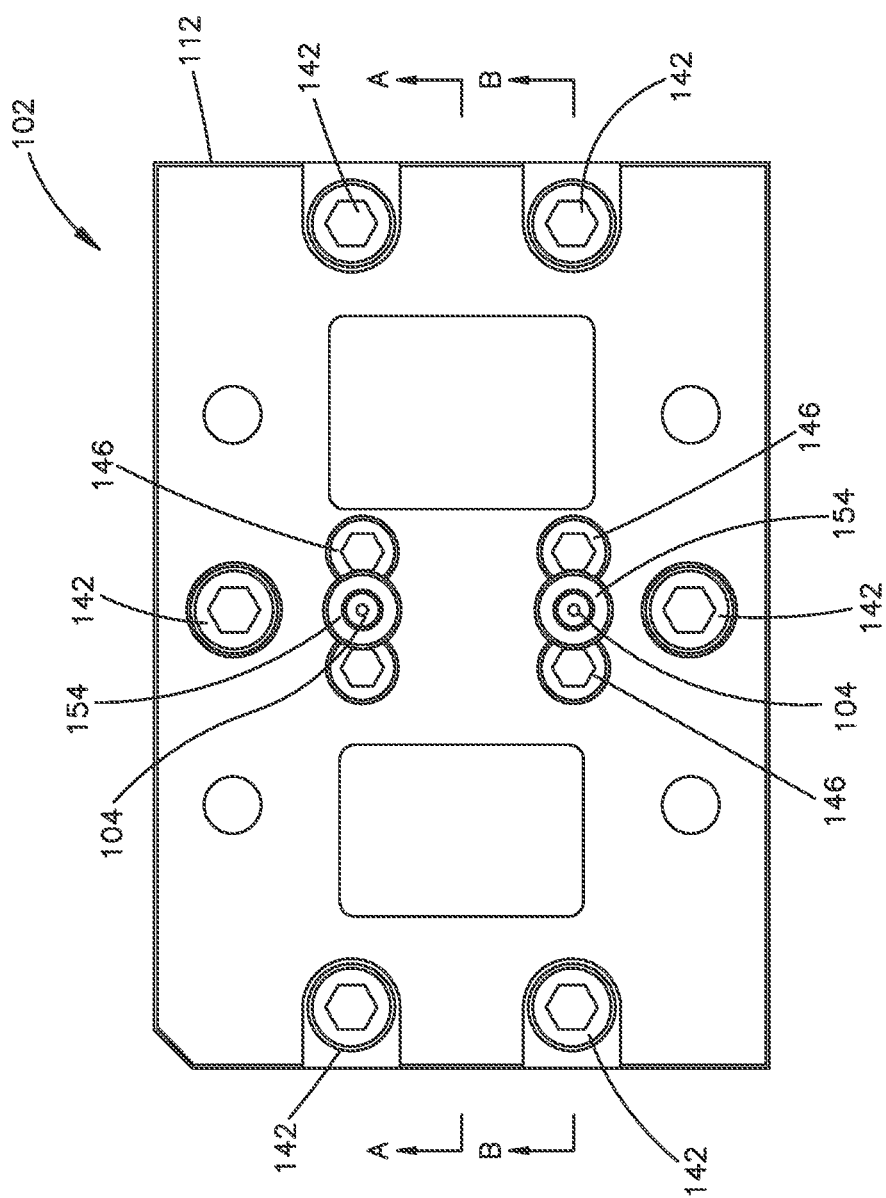

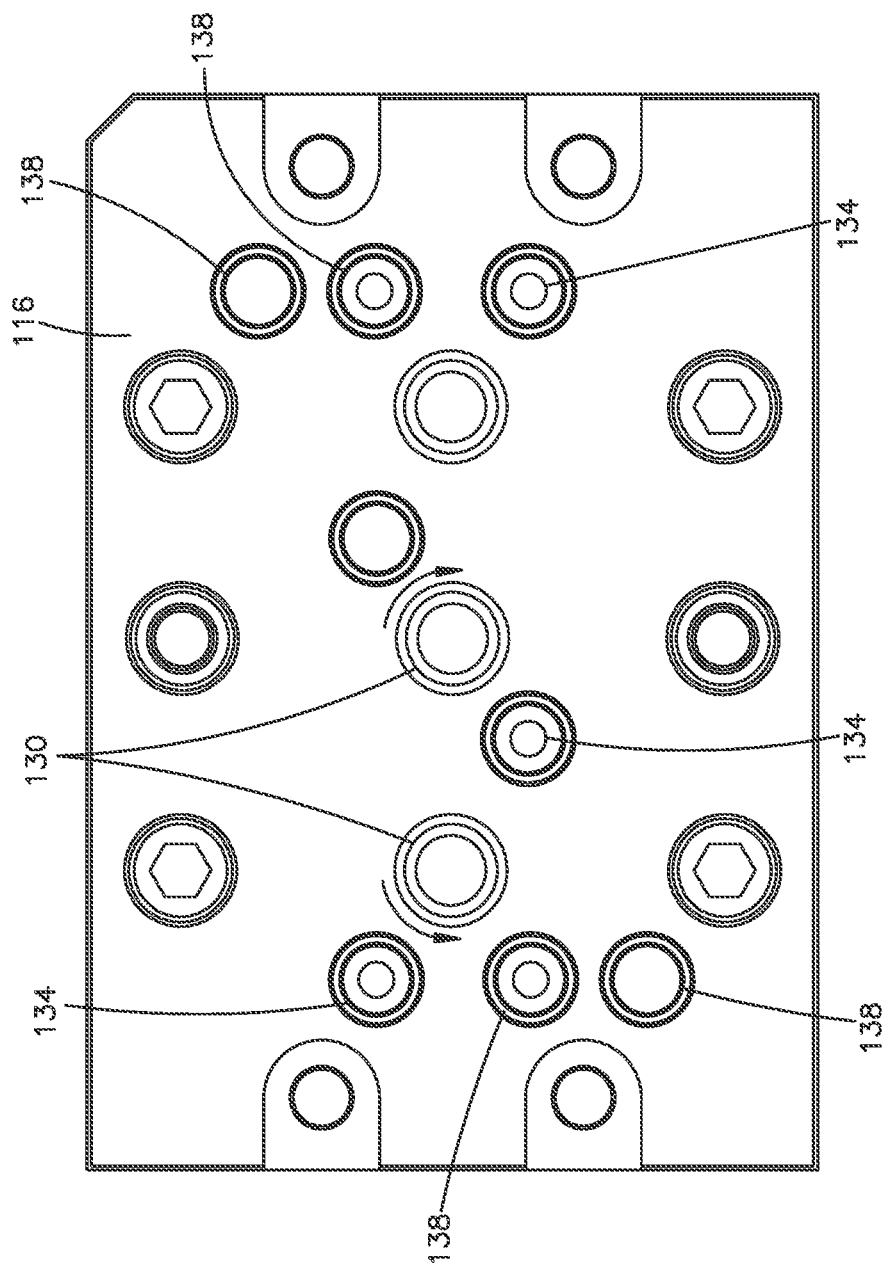

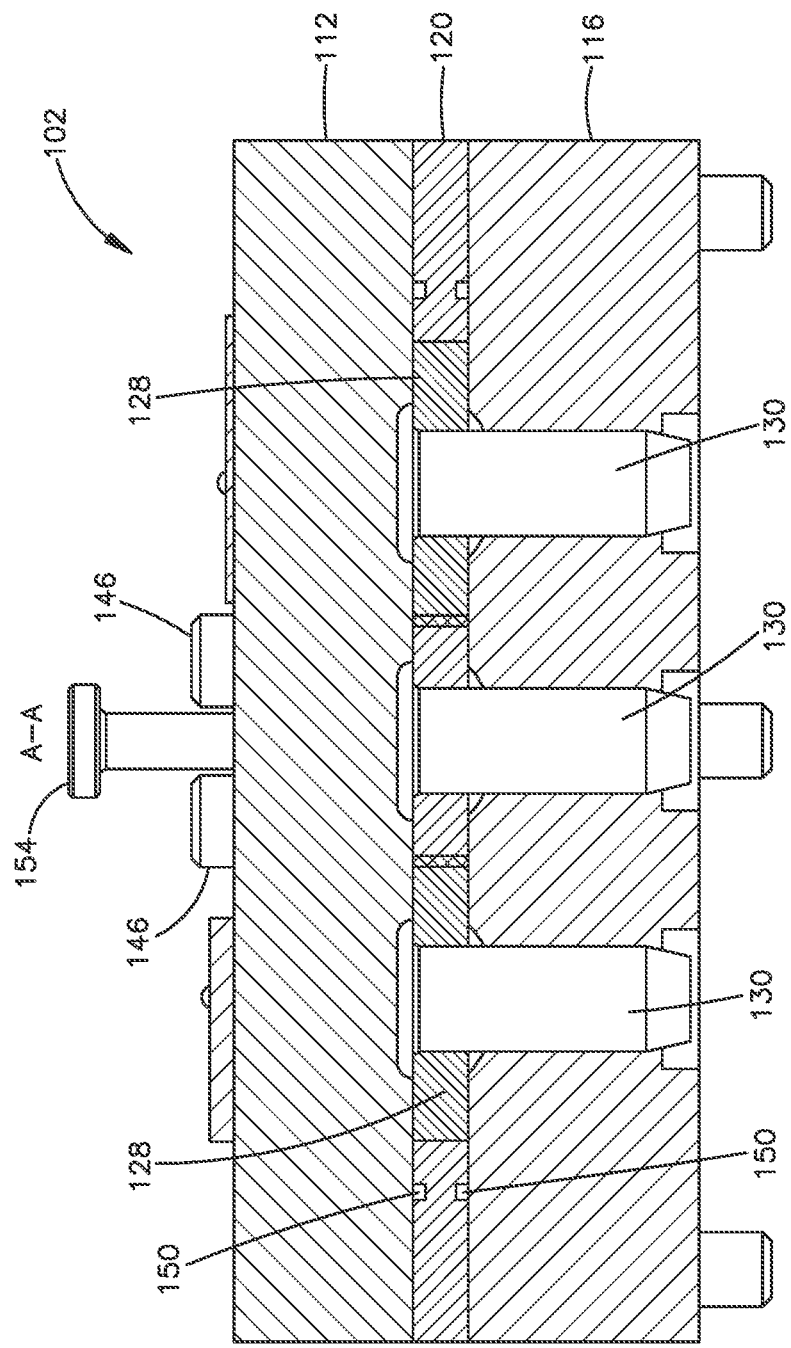

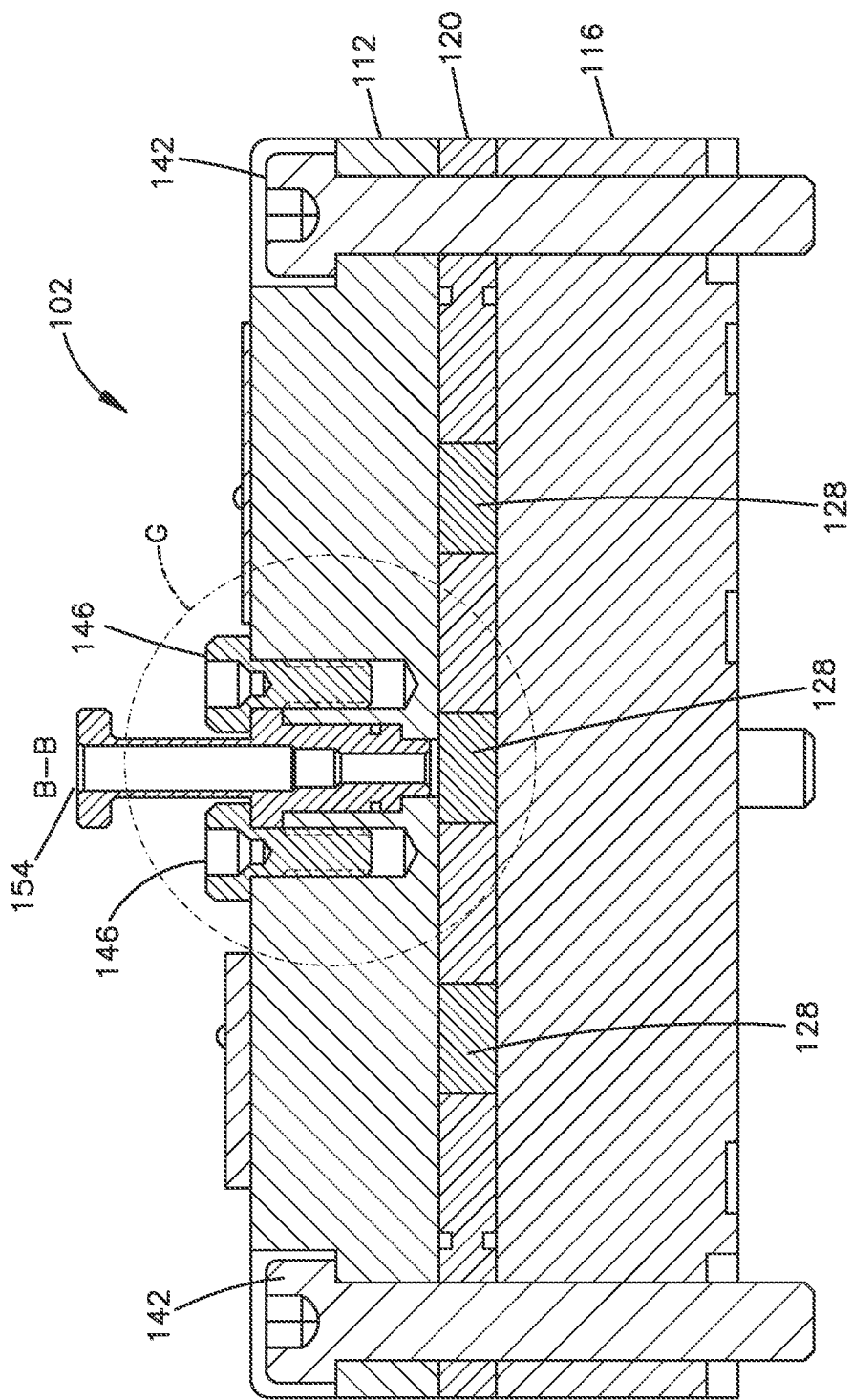

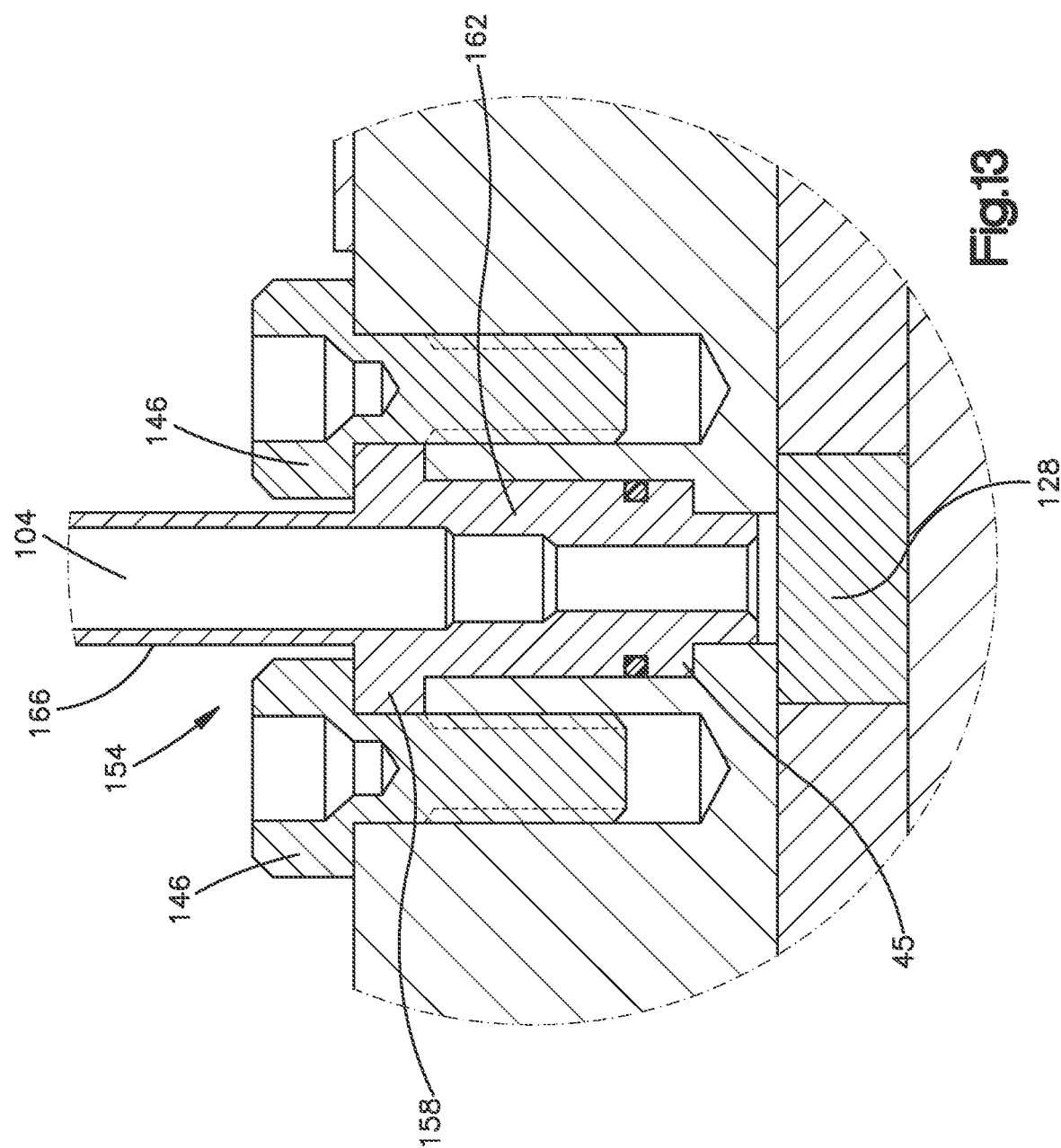

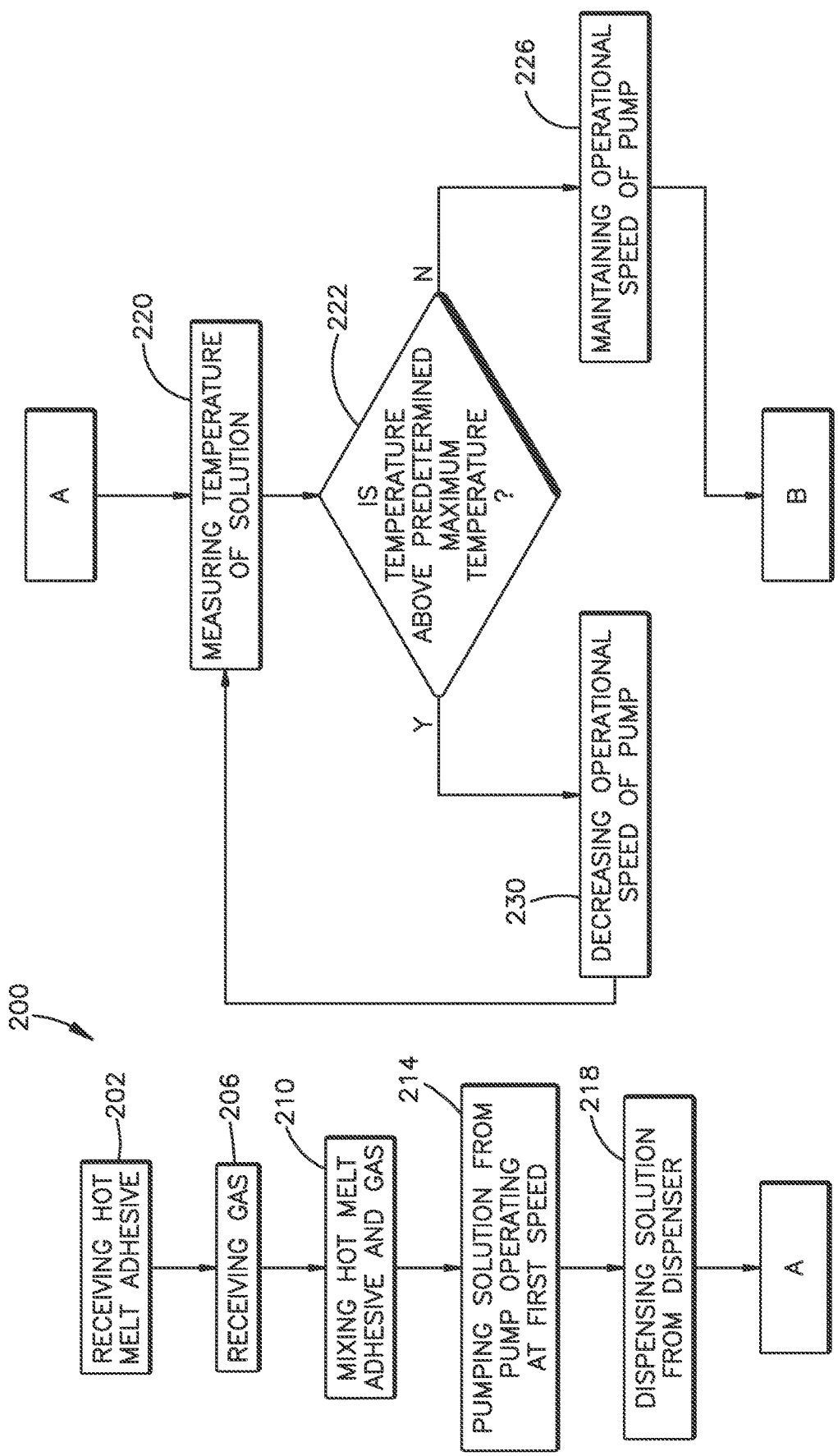

HOT MELT ADHESIVE FOAM DISPENSING SYSTEM

CROSS-REFERENCE TO RELATED APPLICATIONS

This application is a National Stage Application of International Patent App. No. PCT/US2020/022634, filed Mar. 13, 2020, which claims the benefit of U.S. Provisional Patent App. No. 62/819,119, filed Mar. 15, 2019, the entire disclosures of both of which are hereby incorporated by reference as if set forth in their entirety herein.

TECHNICAL FIELD

This disclosure generally relates to hot melt adhesive foam dispensing systems, and more particularly to devices and methods for controlling the dispensing of hot melt adhesive foam onto a substrate from foam dispensing systems.

BACKGROUND

Hot melt thermoplastic adhesives are used in a number of applications such as packaging and product assembly. In conventional hot melt adhesive foam dispensing systems, a pump supplies an adhesive and gas solution to an adhesive dispenser, which can be referred to as a gun. The gun contains a valve at an outlet nozzle through which the solution is dispensed to atmospheric pressure. When the solution is dispensed, the gas is released from the solution to become entrapped in the adhesive to form a foam on a substrate to which the adhesive is applied.

During startup of such dispensing systems, the operator must determine the appropriate speed at which to operate the pump so as to mix the hot melt adhesive and gas and pump the resulting solution to the dispenser. Conventionally, operators have done this by initiating operation of the pump at a low speed, and proceeding to increase the operational speed of the pump until the dispenser is dispensing high quality hot melt adhesive foam. However, this method can prove problematic. As the speed of the pump increases, the interaction between the pump and the solution will cause a corresponding increase in the temperature of the solution being pumped through the dispensing system. This temperature increase can be exacerbated by the use of hot melt adhesive foam versus other dispensable materials, as the bubbles in recirculated solution can decrease the efficiency of the pump, requiring more material to be recirculated to produce stable foam. In some instances, optimal foam may not be produced according to this method until the temperature of the solution reaches levels that adversely affect the dispensing system or the substrate onto which the material is attached.

As a result, there is a need for a dispensing system that can determine an operational speed for the pump that both produces high quality hot melt adhesive foam and does not overheat the solution being pumped through the dispensing system.

SUMMARY

An embodiment of the present disclosure is a dispensing system for dispensing a hot melt adhesive foam onto a substrate. The dispensing system includes a pump having a first input configured to receive a hot melt adhesive and a second input configured to receive a gas, where the pump is configured to mix the hot melt adhesive and the gas to produce a solution. The dispensing system also includes a temperature sensor configured to detect a temperature of the solution, a dispenser configured to receive the solution from the pump and dispense the solution to create the hot melt adhesive foam, and a controller in signal communication with the temperature sensor and the pump. The controller is configured to instruct the pump to operate at a first speed, receive a signal from the temperature sensor that is indicative of the temperature of the solution, and instruct the pump to operate at a second speed that is different than the first speed in response to the signal.

An embodiment of the present disclosure is a method of dispensing hot melt adhesive foam onto a substrate. The method includes receiving a hot melt adhesive from a hot melt adhesive source, receiving a gas from a gas source, and mixing the hot melt adhesive and the gas to produce a solution. The method also includes pumping the solution from a pump operating at a first speed to a dispenser, dispensing the solution from the dispenser to produce the hot melt adhesive foam, measuring a temperature of the solution, and adjusting an operational speed of the pump from the first speed to a second speed that is different than the first speed in response to measuring the temperature.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

FIG. 8 illustrates a perspective view of a gear flow meter according to another example that may be used to implement the flow meter of the dispensing system shown in FIG. 1;

FIG. 9 illustrates a plan view of the gear flow meter shown in FIG. 8;

FIG. 10 illustrates a bottom view of the gear flow meter shown in FIG. 8:

FIG. 11 illustrates a longitudinal cross-sectional view of the gear flow meter shown in FIG. 8; taken along line A-A in FIG. 9;

FIG. 12 illustrates a longitudinal cross-sectional view of the gear flow meter shown in FIG. 8; taken along line B-B in FIG. 9;

FIG. 13 illustrates an enlarged view of a portion of the gear flow meter shown in FIG. 12;

FIG. 14 illustrates a process flow diagram of a method of dispensing hot melt adhesive foam onto a substrate according to an embodiment of the present disclosure;

FIG. 15 illustrates a first continued process flow diagram of the method shown in FIG. 14;

DETAILED DESCRIPTION OF ILLUSTRATIVE EMBODIMENTS

Figure 1:
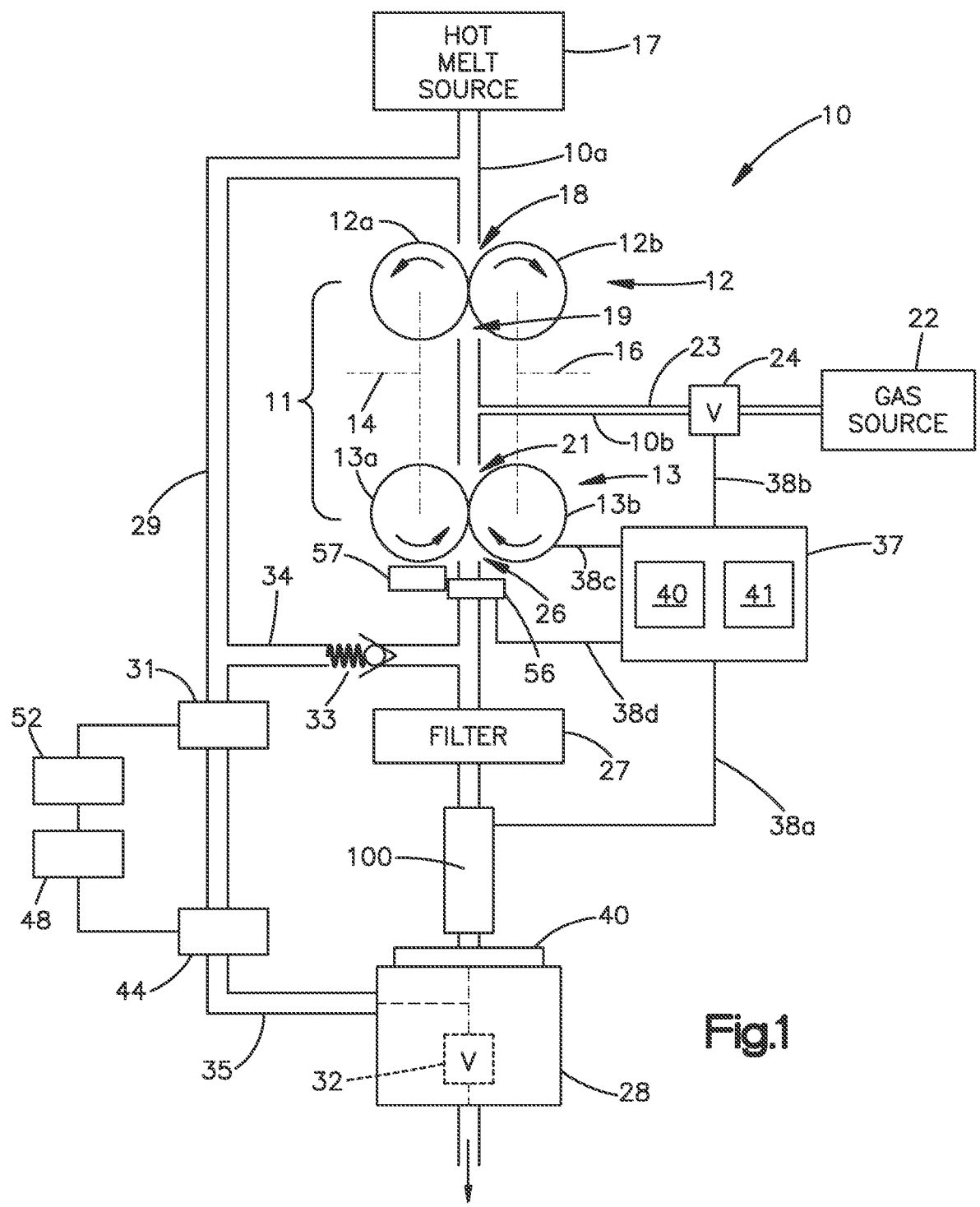
FIG. 1 illustrates a schematic diagram of a dispensing system according to an embodiment of the present disclosure.

With initial reference to FIG. 1, a dispensing system 10 for dispensing hot melt adhesive foam onto a substrate in accordance with an embodiment of the present disclosure can include a pump 11. The pump 11 can be a gear pump, such as (without limitation) a two-stage pump having a first stage 12 and a second stage 13, or any other suitable pump. Each of the first and second stages 12, 13 can include oppositely rotating and meshed gear pairs. For example, the first stage 12 of the pump 11 can include a first gear 12a and a second gear 12b. Similarly, the second stage 13 of the pump 11 can include a first gear 13a and a second gear 13b. In one embodiment, the first gears 12a, 13a of each of the first and second stages 12, 13 define driven gears that are connected by a common drive shaft 14. In this embodiment, the second gears 12b, 13b of each of the first and second stages 12, 13 define idler gears that are connected by a common idler shaft 16. The pump 11 can include a first input 10a configured to receive a hot melt adhesive. Specifically, the hot melt adhesive can be provided to the pump 11 through the first input 10a from a hot melt adhesive source 17. The hot melt adhesive source 17 can be a conventional adhesive melter configured to store solid adhesive, melt the solid adhesive into hot melt adhesive, and selectively provide the pump 11 with the hot melt adhesive. However, the hot melt adhesive source 17 can be any conventional type of hot melt adhesive source as desired.

Once received through the first input 10a, the hot melt adhesive can be fed at atmospheric pressure into a low pressure inlet 18 of the first stage 12 of the pump 11. The first stage 12 can also include an outlet 19, such that the first stage 12 can deliver the hot melt adhesive to the outlet 19 at a metered rate. After exiting the outlet 19 of the first stage 12, the hot melt adhesive can be introduced into an inlet 21 of the second stage 13 of the pump 11 flowing at the metered rate. In addition to the hot melt adhesive, gas can be provided from a gas source 22 into a second input 10b of the pump 11. Specifically, the gas can flow from the gas source 22, through a gas line 23, through the second input 10b, and into the inlet 21 of the second stage 13. The gas may be, for example, nitrogen, air, or carbon dioxide, though other gasses are contemplated. The dispensing system 10 can also include a gas valve 24 in fluid communication with the gas line 23 between the gas source 22 and the second input 10b. The gas valve 24 can be configured to control an amount of gas provided to the pump 11 through the second input 10b. The operation of the gas valve 24 will be described in more detail hereinafter.

After being received through the inlet 21 of the second stage 13, the gas from the gas source 22 and the hot melt adhesive from the outlet 19 of the first stage 12 are mixed in the second stage 13 of the pump 11. The pump 11 is configured to mix the hot melt adhesive and the gas under such pressure that the gas goes into solution with the molten adhesive. The pump 11 can then pump the solution at a volumetric flow rate from an outlet 26 of the second stage 13 of the pump 11. After exiting the outlet 26, a temperature sensor 56 in fluid communication with the solution can be configured to detect a temperature of the solution, as will be discussed further below. In the depicted embodiment, the temperature sensor 56 can be positioned adjacent the outlet 26 of the second stage 13, though other positions are contemplated. In some examples, a heat exchange device 57 can be positioned adjacent the outlet 26, where the heat exchanger can be configured to selectively decrease the temperature of the solution exiting the outlet 26. In such examples, the temperature sensor 56 can be positioned at the outlet 26, at an outlet of the heat exchanger device 57, or both. The temperature sensor 56 can include an immersion probe that is received in the fluid flow. Additionally, or alternatively, the temperature sensor 56 can monitor temperature of a wall or surface that is in contact with the fluid flow, and that has a temperature that is responsive to the temperature of the fluid flow.

The solution can then flow through a filter 27 to a flow meter 100. As such, the filter 27 can be fluidly disposed between the pump 11 and the flow meter 100. The filter 27 can be configured to separate any hardened particles of the hot melt adhesive that may have solidified while passing through the pump 11 or were never melted by the hot melt adhesive source 17. The flow meter 100 can be configured to measure the volumetric flow rate of the solution pumped by the pump 11. Thus, the flow meter 100 can be implemented as a volumetric flow meter. In some examples, the flow meter 100 can be implemented as a gear flow meter; however, it will be understood that other suitable flow meters may be employed. After flowing through the flow meter 100, the solution can be provided to a dispenser 28, which can comprise a valved adhesive dispensing gun. The dispenser 28 can be configured to receive the solution from the pump 11 and dispense the solution onto a substrate so as to create a hot melt adhesive foam, as the gas previously comprising the solution will be released from the solution and become entrapped in the adhesive.

During normal operation of the system, the solution that flows from the outlet 26 of the second stage 13 of the pump 11 is fluidly coupled to the first input 10a of the pump 11. For example, the dispensing system 10 can include a first recirculation channel 35 and a second recirculation channel 29 configured to selectively direct the solution from the dispenser 28 to the pump 11. The dispenser 28 can include a dispenser valve 32 that is configured to be transitioned between an open position, in which the dispenser 28 dispenses at least a portion of the solution, and a closed position, in which the dispenser 28 dispenses none of the solution, to dispense the solution onto a substrate to form the hot melt adhesive foam. When the dispenser valve 32 is in an open position, and thus the dispenser 28 is dispensing the solution, a portion, such as for example 75%, of the solution is recirculated through the first and second recirculation channels 35, 29. Likewise, the remaining 25% of the flow of solution from the pump 11 can be dispensed by the dispenser 28. Though one particular split of the solution is described, this is exemplary only and the solution can be split in different percentages as desired. For example, any percentage from 1% to 100% of the solution can be dispensed from the dispenser 28 when the dispenser valve 32 is in the open position. When the dispenser valve 32 is closed, all of the solution flowing from the outlet 26 of the second stage 13 of the pump 11 can be recirculated through the second recirculation channel 29.

The dispensing system 10 can include a translucent panel 43 connected to the dispenser 28. The translucent panel 43 can comprise a window that allows an operator of the dispensing system 10 to view the solution, and particularly the gas bubbles within the solution, as the solution flows into the first recirculation channel 35. As objectively measuring quality of the hot melt adhesive foam applied to the substrate can be difficult using various measuring devices, the translucent panel 43 allows the operator to easily monitor solution quality and make adjustments to the operation of the dispensing system 10 accordingly. The operator can also monitor the quality of the hot melt adhesive foam being dispensed from the dispenser 28 and make adjustments to the operation of the dispensing system 10 accordingly.

As the amount of solution flowing through the first and second recirculation channels 35, 29 can vary as described above during operation of the dispensing system 10, the pressure of the solution within the dispenser 28 can be affected by the pressure of the material flowing through the first and second recirculation channels 35, 29. As such, the dispensing system 10 can contain devices for controlling the pressure of the solution flowing through the first and second recirculation channels 35, 29. In one embodiment, the dispensing system 10 can include a pressure regulator 31 in fluid communication with the first and second recirculation channels 35, 29, where the pressure regulator 31 is configured to control the pressure of solution flowing through the first recirculation channel 35. Though the pressure regulator 31 is depicted as connected to the first recirculation channel 35, in other embodiments the pressure regulator 31 can be connected to the second recirculation channel 29. The pressure regulator 31 can be controlled by a transducer 52, such as an electro-pneumatic (E/P) transducer that is configured to selectively actuate the pressure regulator. However, any conventional device for controlling operation of a pressure regulator 31 can alternatively be utilized.

The dispensing system 10 can also include a pressure sensor 44 in fluid communication with the first recirculation channel 35, where the pressure sensor 44 is configured to measure the pressure of the solution flowing through the first recirculation channel 35 upstream from the pressure regulator 31. The pressure sensor 44 can be a pressure transducer, though other conventional pressure-measuring devices can be utilized. Both the transducer 52 and the pressure sensor 44 can be in signal communication with a controller 48, where the controller 48 is configured to receive signals from the pressure sensor 44 that are indicative of the pressure of the solution flowing through the first recirculation channel 35. The controller 48 can utilize this signal to control the transducer 52, and thus the pressure regulator 31, so as to instruct the transducer 52 to actuate the pressure regulator 31 based on the pressure measured by the pressure sensors 44. As a result, the dispensing system 10 can maintain a substantially consistent pressure of the solution at the dispenser 28. In one embodiment, the controller 48 is a proportional-integral-derivative (PID) controller. However, the controller 48 can alternatively be a proportional controller, or any other type of controller capable of controlling the transducer 52 based upon signals received from the pressure sensor 44. Further, the controller 48 can be configured to receive a user input from an operator of the dispensing system 10 so as to set the desired pressure of the solution flowing through the first recirculation channel 35.

During operation of the dispensing system 10, the solution can become blocked within various components of the system. For example, the solution can become blocked as the solution flows through the outlet 26 of the second stage 13 of the pump 11, such as in the filter 27 or the dispenser 28. Such blockages can result in a pressure buildup at the outlet 26, thus negatively affecting operation of the dispensing system 10. To prevent this, the dispensing system 10 can include a pressure relief path 34 that is in communication with the outlet 26 of the second stage 13 of the pump 11 and extends to the second recirculation channel 29. A pressure relief valve 33 can be connected to the pressure relief path 34 and can be configured to open upon the pressure of fluid flowing from the outlet 26 reaching a predetermined threshold. When the pressure of the solution reaches the predetermined threshold, opening of the pressure relief valve 33 allows the solution to escape to the second recirculation channel 29 and flow to the first input 10a of the pump 11. Accordingly, the pressure relief valve 33 and pressure relief path 34 can prevent excessively pressurized solution from building up at the outlet 26 of the second stage 13 of the pump 11.

To control the various components of the dispensing system 10, the dispensing system 10 can include a controller 37. In one embodiment, the controller 37 can comprise a PID controller. In another embodiment, the controller 37 can comprise a proportional controller. However, it is contemplated that the controller 37 can comprise any suitable computing device configured to host a software application for monitoring and controlling various operations of the dispensing system 10 as described herein. It will be understood that the controller 37 can include any appropriate computing device, examples of which include a processor, a desktop computing device, a server computing device, or a portable computing device, such as a laptop, tablet, or smart phone. Specifically, the controller 37 can include a memory 40 and a human-machine interface (HMI) device 41. The memory 40 can be volatile (such as some types of RAM), non-volatile (such as ROM, flash memory, etc.), or a combination thereof. The controller 37 can include additional storage (e.g., removable storage and/or non-removable storage) including, but not limited to, tape, flash memory, smart cards, CD-ROM, digital versatile disks (DVD) or other optical storage, magnetic tape, magnetic disk storage or other magnetic storage devices, universal serial bus (USB) compatible memory, or any other medium which can be used to store information and which can be accessed by the controller 37. The HMI device 41 can include inputs that provide the ability to control the controller 37, via, for example, buttons, soft keys, a mouse, voice actuated controls, a touch screen, movement of the controller 37, visual cues (e.g., moving a hand in front of a camera on the controller 37), or the like. The HMI device 41 can provide outputs, via a graphical user interface, including visual information, such as the visual indication of the current pressure values of the gas, hot melt adhesive, and/or the solution, as well as acceptable ranges for these parameters via a display. Other outputs can include audio information (e.g., via speaker), mechanically (e.g., via a vibrating mechanism), or a combination thereof. In various configurations, the HMI device 41 can include a display, a touch screen, a keyboard, a mouse, a motion detector, a speaker, a microphone, a camera, or any combination thereof. The HMI device 41 can further include any suitable device for inputting biometric information, such as, for example, fingerprint information, retinal information, voice information, and/or facial characteristic information, for instance, so as to require specific biometric information for accessing the controller 37.

The controller 37 can be in signal communication with various components of the dispensing system 10 so as to receive signals from and/or provide instructions to each component. The controller 37 can be in signal communication with the flow meter 100 through signal connection 38a, the gas valve 24 through signal connection 38b, the pump 11 through signal connection 38c, and the temperature sensor 56 through signal connection 38d. Each of the signal connections 38a-38d can comprise wired and/or wireless connections.

Now referring to FIGS. 2-7, a gear flow meter 80 that can be used to implement the flow meter 100 of FIG. 1 will be described in further detail. It will be understood that the dispensing system 10 can include alternatively configured flow meters as desired. The flow meter 80 comprises a housing body 82 having a flow inlet passage 84 and a flow outlet passage 85. The flow inlet passage 84 is configured to receive the solution from upstream components such as the pump 11. The flow outlet passage 85 is configured to discharge the solution to downstream components such as to the dispenser 28. The housing body 82 of the flow meter 80 can be removably connected to a body (not shown) of the dispensing system 10 such as a housing via fasteners 87a, such as screws or bolts. The flow meter 80 further includes a housing cover 83 that is removably connected to the housing body 82 by a plurality of fasteners 87b, such as screws or bolts.

The flow meter 80 comprises a pair of rotatable gears 86 and at least one sensor 88, such as a magnetic pick-up sensor, configured to measure an amount of the liquid adhesive flowing through the flow meter. A pair of sensors 88a, 88b are shown in the implementation of the flow meter 80 depicted in the figures. In particular, the pair of sensors 88a, 88b are configured to measure rotation of the rotatable drive gears 86 to determine an amount of the adhesive flowing out of the flow outlet 85 passage.

The housing body 82 comprises an elastomeric seal 89, such as an elongated or oval shaped O-ring, to maintain a watertight seal with the cover to prevent fluid leakage from the flow meter. The gears 86 are contained within a hollow central recess 82a of the housing body 82 so that they are free to rotate about an axis of rotation. In particular, the gears are secured between the housing body 82 and the housing cover 83 so as to be rotatable. In one implementation, the gears 86 are a substantially linear series of intermeshing, flow-metering spur gears that are each configured to rotate about respective pins 81 provided in corresponding bushings 81a in the housing body 82. The gears 86 are positioned so that they are substantially coplanar, and so that each gear is parallel to and spaced from at least one neighboring gear. Further, the gears 86 are positioned so that an axis of rotation of each of the gears is positioned along a common central line. The gears 86 are also positioned so that the teeth of each gear intermesh with the teeth of the neighboring gear.

The flow inlet passage 84 provides a conduit to the inlet side of the intermeshing pair of gears 86. Similarly, flow outlet passage 85 provides a conduit from the discharge side of the intermeshing pair of gears 86. The gears 86 are in fluid communication with a flow inlet passage 84 that directs the solution into the recess 82a toward the inlet side of the intermeshing pair of gears. As a result, the solution drives the gears 86 in tandem so that each of the gears rotate in an opposite direction relative to each other. For example, one of the gears rotates in a counterclockwise direction while its immediately neighboring gear rotates in a clockwise direction. Employing counter-rotating gears 86 creates a positive displacement for precise metering of liquid hot melt adhesive.

As a result of this rotation of the gears 86, after the solution is directed to the inlet side of the intermeshing portion of the gears via the flow inlet passage 84, the solution is divided in half by the two gears. This occurs because, as the gears rotate, solution flows into the spaces between the teeth of each of the oppositely rotating intermeshing pair of gears. Thus, two solution streams are respectively carried in opposite directions around the perimeter of the central recess 82a by the teeth of each oppositely rotating gear, such that the two solution streams converge near the flow outlet passage 85. Accordingly, the volume of solution flowing between the gears 86 and the perimeter wall of the central recess 82a represents the volume of solution per pulse. As the respective gear teeth of each neighboring gear comes into mesh with each other, the solution is displaced from the spaces between the gear teeth of each gear, which forces the solution into and through the flow outlet passage 85 that is adjacent the intermeshing pair of gears. Thus, during this process, the solution moving through the flow meter 80 exerts rotational forces on the gears 86, causing them to rotate at a particular rate. The sensors 88a, 88b are configured to measure this speed of rotation of the gears 86 in order to determine the flow rate of solution moving through the flow meter 80. The gear-tooth flow meter 80 is configured to provide a resolution of, for example, approximately 25 mg.

Figure 3:
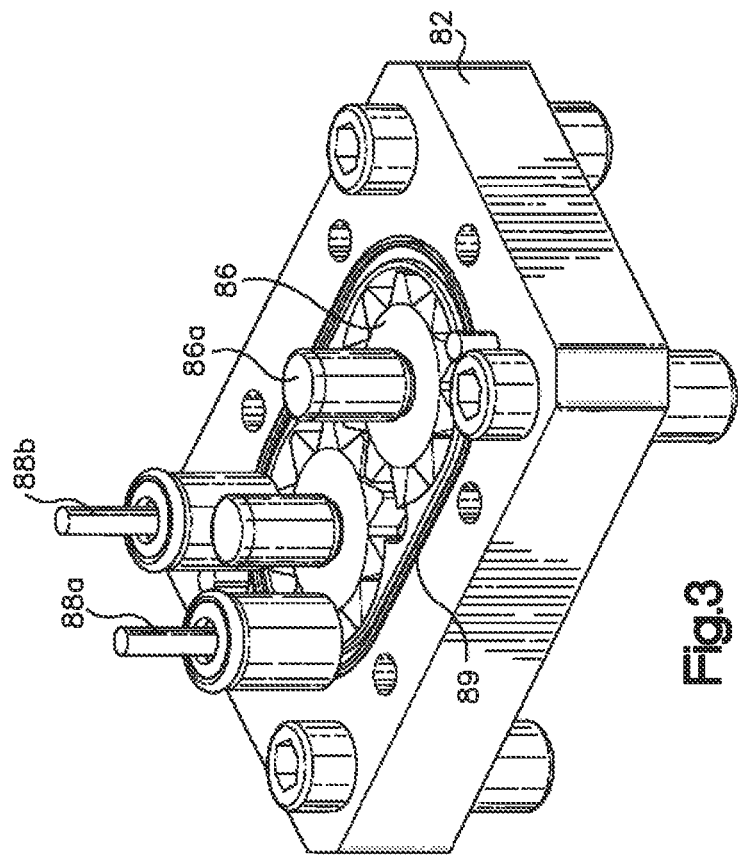
FIG. 3 is atop perspective view of the flow meter of FIG. 2 with the housing cover removed.
Figure 2:
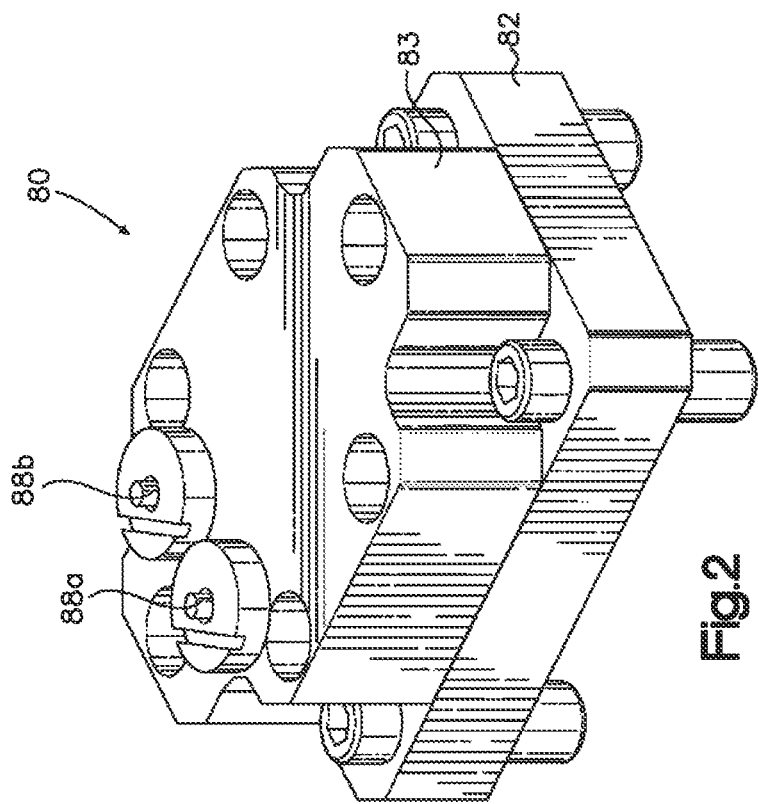
FIG. 2 is top perspective view of a gear flow meter according to one example that may be used to implement the flow meter of the dispensing system shown in FIG. 1.
Figure 4:
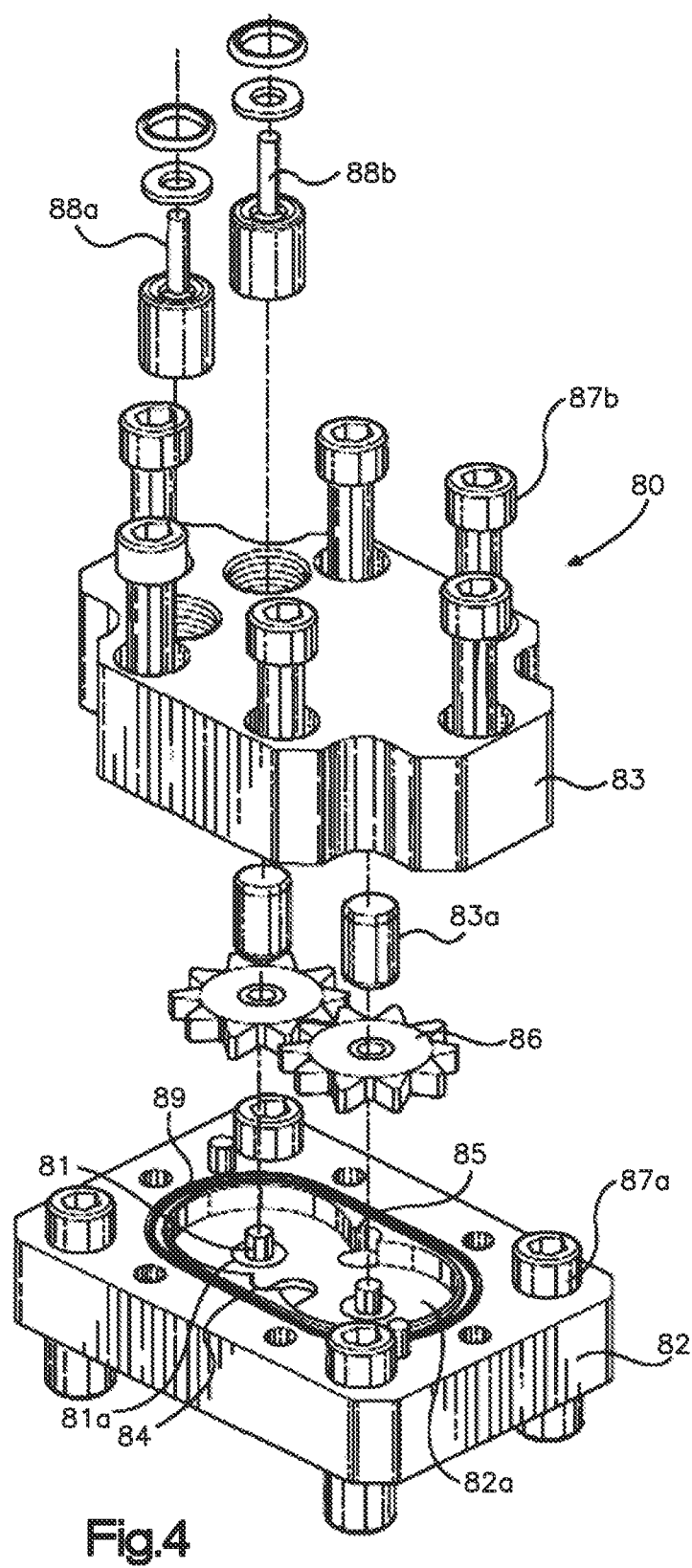
FIG. 4 is a top exploded perspective view of the flow meter of FIG. 2.
Figure 5:
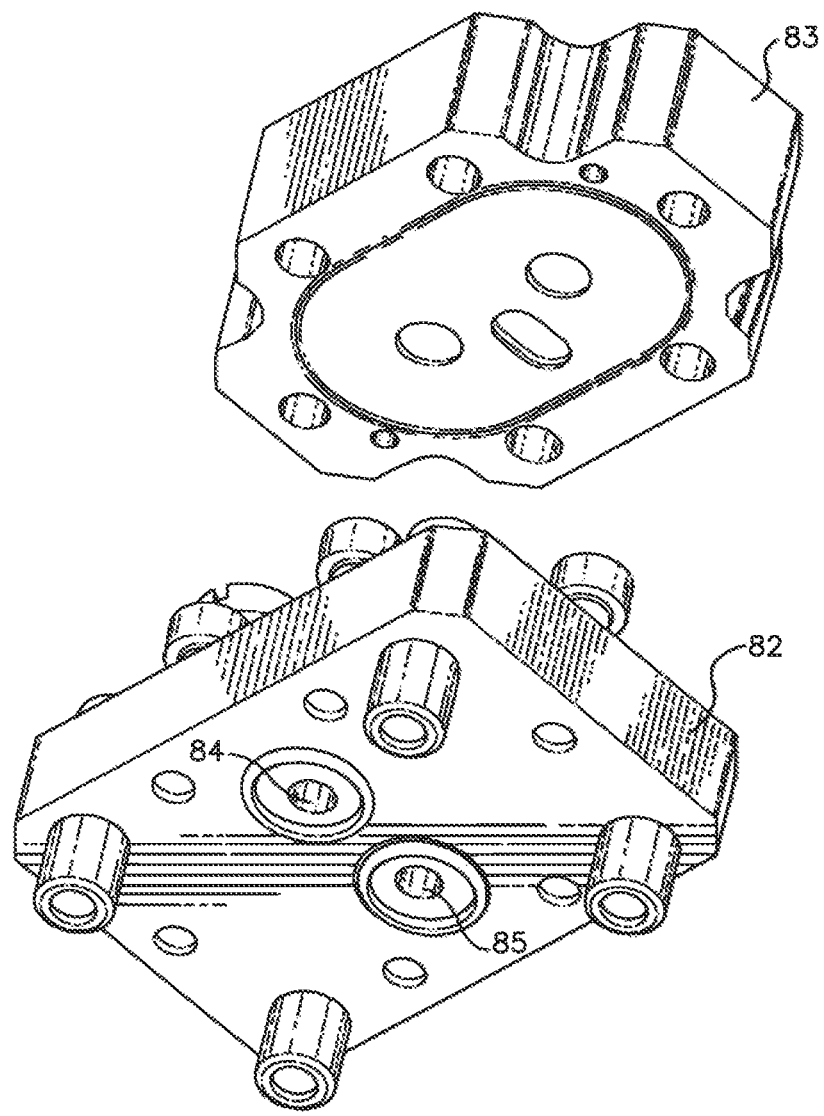
FIG. 5 is a bottom partially exploded perspective view of the flow meter of FIG. 2.
Figure 6:
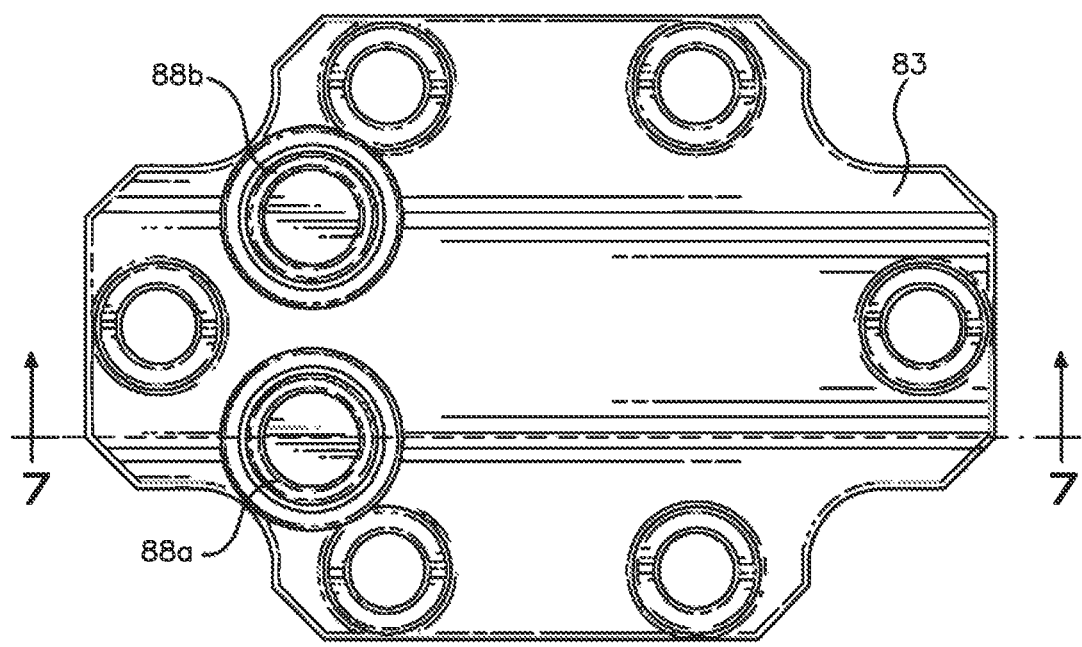
FIG. 6 is a perspective view of a bottom portion of the flow meter of FIG. 2.
Figure 7:
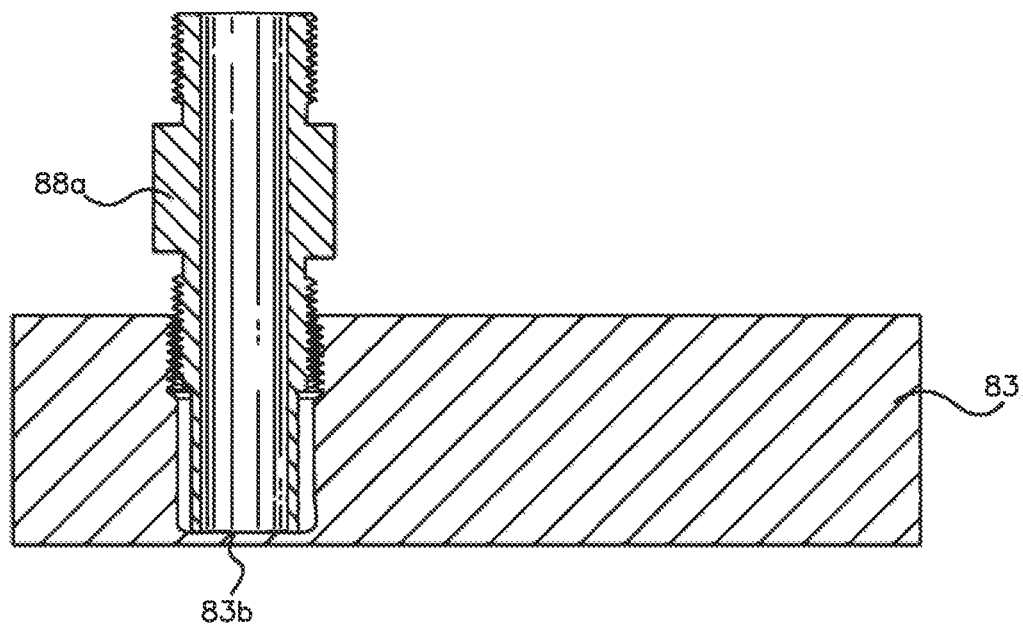
FIG. 7 is a cross-sectional view of the housing cover of the flow meter of FIG. 2 taken along line 7-7 of FIG. 6.

As shown in FIGS. 3 and 4, the gears 86 are bounded within the recess 82a by a flat inner surface of the housing cover 83. Each gear may further be bounded by a respective hardened support shaft 83a provided in the housing cover 83. A thin membrane 83b is provided underneath each sensor 88a, 88b on the flat inner surface of the housing cover 83, such that the thin membrane 83b is located between the sensors 88a, 88b and the gears 86.

Turning now to FIGS. 8 to 13, a gear flow meter 102 is shown according to another embodiment that can implement the flow meter 100 of FIG. 1. The gear flow meter 102 can comprise a multipart housing 108 that includes an upper housing portion 112 and a lower housing portion 116 connected to the upper housing portion 112. The gear flow meter 102 can also include a gear chamber 120 disposed between the upper housing portion 112 and the lower housing portion 116. One or more connections 124 can be included on the top side of upper housing portion 112 for receiving and connecting a probe 154 that includes a fiber optic 104. Additionally, one of the connections 124 can be configured to connect with the signal connection 38a that connects the gear flow meter 102 to the controller 37.

The upper housing portion 112, lower housing portion 116, and gear chamber 120 can be connected to each other by screw connections 142. Connections 124 for probe 154 and fiber optic 104 on the top side of upper housing portion 112 can be fixed by means of screws 146. The lower housing portion 116 can have a plurality of fluid inlets 134 and fluid outlets 138. Fluid passing through gear flow meter 102, via the fluid channels located in upper and lower housing portions 112, 116, can be received from the pump 11 through the fluid inlets 134 and directed out of the gear flow meter 102 through the fluid outlets 138.

Rotating axles 130, which can be disposed adjacent to fluid inlets 134 and fluid outlets 138, extend through parts of housing 108. The gear chamber 120 of the gear flow meter 102 can be sealed against the upper housing portion 112 and the lower housing portion 116 by sealing elements 150 to prevent the solution from exiting the housing 108. The axles 130 can be configured to rotate and can each carry a gear 128 driven by the fluid entering through the fluid inlets 134 located adjacent to gears 128. The gears 128 can be configured to transport the solution in the direction of rotation of the gears 128 to the fluid outlets 138, from which the solution continues to flow to the dispenser 28. The fluid can be transported through cavities formed between engaging gears 128 and the wall of the gear chamber 120 that surrounds the gears 128. The depicted embodiment shows the positioning of probe 154. In this embodiment, probe 154 is located substantially parallel to the rotating axles 130 and offset from sectional plane A-A.

At least one probe 154 can be inserted into upper housing portion 112 as part of a measuring unit, where said measuring unit can be configured to perform contactless optical detection of the rotational speed of one of gears 128. The probe 154 can be inserted light-sealingly and fluid-sealingly into a correspondingly shaped recess 162 in the housing 108 of the gear flow meter 102. In order to fasten the probe 154, the probe 154 can comprise a shape 166 having a circumferential flange 158 that is partially overlapped by the screw heads of the screws 146. The probe 154 is connected via a fiber optic 104 to a light source that is designed to produce light, where the light source is part of the measuring unit. The probe 154 of the measuring unit is adapted to emit light onto a portion of one of the gears 128, from which the light is reflected. The probe 154 can be spaced apart from the rotating axle 130 of the gear 128, such that the portion of the gear 128 onto which the probe 154 emits light is between the tip diameter and the root diameter of the gear 128. The probe 154 can be adapted to receive light reflected off the portion of the gear 128 onto which the probe 154 emits light. In order to analyze the light received from probe 154, the measuring unit includes a signal transducer which is adapted to detect light received by probe 154 and returned via fiber optic 104 to the signal transducer, in order to produce electrical signals corresponding to the intensity of the reflected light that are representative of the rotational speed of gear 128. The gear flow meter 102 can then transmit a signal to the controller 37 that is indicative of the rotational speed of the gear 128, from which the controller 37 can determine the volumetric flow rate of the solution.

Returning to FIG. 1, the controller 37 can control and utilize information received from the various components of the dispensing system 10 during startup of the dispensing system 10 so as to determine the operational speed of the pump 11 that will result in high quality hot melt adhesive foam while not overheating the solution flowing through the dispensing system 10. Upon startup, the controller 37 can instruct the pump 11 to operate at a first speed. In one embodiment, the first speed can be the maximum speed of the pump 11, though it is contemplated that the first speed can also be less than the maximum speed of the pump 11. For example, the first speed can be about 1000 revolutions per minute. However, the first speed can differ depending upon the type of pump 11 utilized in the dispensing system 10.

Due to the interaction between the pump 11 and the solution while the pump 11 is pumping the solution to the dispenser 28, the temperature of the solution at the outlet 26 of the second stage 13 of the pump 11 may be greater than the temperature of the hot melt adhesive and/or the gas received by the pump 11. In general, higher pump speeds result in more mixing and better foam quality. However, due to inefficiencies of the pump, pump speeds that are too high can result in excess temperature rise. Once the temperature is elevated to a certain point, the elevated temperature of the solution can create problems within the dispensing system 10 and on the substrate to which the hot melt adhesive foam is applied.

As such, the controller 37 can adjust the speed of the pump 11 in response to the measured temperature of the solution. For example, the controller 37 can find a speed that results in good mixing and acceptable temperature rise. In some instances, the controller 37 can find a highest or near highest speed that results in the best or near best mixing and acceptable temperatures rise. In one embodiment, the controller 37 can be configured to initiate operation of the pump 11 at a higher speed and systematically lower the speed of the pump 11 until the temperature of the solution is at or below a predetermined maximum temperature. For example, the predetermined maximum temperature can be about 202° Celsius. However, it is contemplated that the predetermined maximum temperature can be from about 185° Celsius to about 210° Celsius, and can vary based upon the type of solution being mixed by the pump 11 or the type of dispensing operation being performed. The predetermined maximum temperature can be recalled from the controller 37 based upon these factors, or can be input into the HMI device 41 by the operator of the dispensing system 10. It will be understood that the user input can be selected from a set of predetermined values. The predetermined values, such as the temperature and pump speed can be stored, for example, in a database, a library, or in another suitable location. In another embodiment, the controller 37 can initiate operation of the pump 11 at a lower speed and systematically raise the speed of the pump 11 until the temperature of the solution is at or below the predetermined maximum temperature.

After initiating operation of the pump 11 at the first speed, the temperature sensor 56 can detect the temperature of the solution. As stated above, the temperature sensor 56 can be positioned adjacent the outlet 26 of the second stage 13 of the pump 11. This positioning can be advantageous, as it allows the temperature sensor 56 to accurately detect any temperature rise in the solution caused by interaction with the pump 11. The controller 37 can receive a signal from the temperature sensor 56 via the signal connection 38*d* that is indicative of the temperature of the solution. Upon receiving this signal, the controller 37 can instruct the pump 11 to operate at a second speed that is different than the first speed in response to the signal. The second speed can be the operating speed of the pump 11 after startup.

In one embodiment, when operation of the pump 11 is initiated at a higher speed, the controller 37 can compare the temperature of the solution to the predetermined maximum temperature and determine whether the temperature is above the predetermined maximum temperature. When the temperature is below the predetermined maximum temperature, the controller 37 can be configured to instruct the pump 11 to maintain operating at the first speed. However, when the temperature of the solution is above the predetermined maximum temperature, the controller 37 can be configured to instruct the pump to operate at a second speed that is less than the first speed. This decrease in speed can be performed according to a PID control algorithm. Alternatively, this decrease can be performed according to a proportional control algorithm.

When transitioning to the second speed from the first speed, the controller 37 can instruct the pump 11 to decrease its speed in a set increment. The increments can be 10 revolutions per minute (RPM), though other increments in speed decreases can be utilized. For example, the increment can be about 1% of the maximum RPM of the pump 11. After the pump 11 has been operating at the second speed for a period of time so as to allow the temperature of the solution to stabilize, where the period of time can be about 5-15 minutes, though other periods of time are contemplated, the temperature sensor 56 can again detect the temperature of the solution. As above, the controller 37 can receive a signal from the temperature sensor 56 via the signal connection 38*d* that is indicative of the temperature of the solution. Upon receiving this signal, the controller 37 can compare the temperature of the solution with the pump 11 operating at the second speed to the predetermined maximum temperature and determine whether the temperature is above the predetermined maximum temperature. When the temperature is below the predetermined maximum temperature, the controller 37 can be configured to instruct the pump 11 to maintain operating at the second speed. However, when the temperature of the solution is above the predetermined maximum temperature, the controller 37 can be configured to instruct the pump 11 to operate at a third speed that is less than the second speed. This process can repeat and continue until the temperature sensed by the temperature sensor 56 is below the predetermined maximum temperature.

In another embodiment, when operation of the pump 11 is initiated at a lower speed, the controller 37 can compare the temperature of the solution to the predetermined maximum temperature and determine whether the temperature is below the predetermined maximum temperature. When the temperature is above or at the predetermined maximum temperature, the controller 37 can be configured to instruct the pump 11 to maintain operating at the first speed or reduce the speed of the pump to be below the first speed. However, when the temperature of the solution is below the predetermined maximum temperature, the controller 37 can be configured to instruct the pump to operate at a second speed that is greater than the first speed. This increase in speed can be performed according to a PID control algorithm. Alternatively, this increase can be performed according to a proportional control algorithm.

When transitioning to the second speed from the first speed, the controller 37 can instruct the pump 11 to increase its speed in a set increment. The increments can be 10 revolutions per minute (RPM), though other increments in speed increases can be utilized. For example, the increment can be about 1% of the maximum RPM of the pump 11. After the pump 11 has been operating at the second speed for a period of time so as to allow the temperature of the solution to stabilize, where the period of time can be about 5-15 minutes, though other periods of time are contemplated, the temperature sensor 56 can again detect the temperature of the solution. As above, the controller 37 can receive a signal from the temperature sensor 56 via the signal connection 38*d* that is indicative of the temperature of the solution. Upon receiving this signal, the controller 37 can compare the temperature of the solution with the pump 11 operating at the second speed to the predetermined maximum temperature and determine whether the temperature is below the predetermined maximum temperature. When the temperature is above or at the predetermined maximum temperature, the controller 37 can be configured to instruct the pump 11 to maintain operating at the second speed or reduce the speed of the pump 11 to be below the second speed. However, when the temperature of the solution is below the predetermined maximum temperature, the controller 37 can be configured to instruct the pump 11 to operate at a third speed that is greater than the second speed. This process can repeat and continue until the temperature sensed by the temperature sensor 56 is above or at the predetermined maximum temperature. When a speed of the pump 11 is finally reached according to this method at which the temperature of the solution meets or exceeds the predetermined maximum temperature, the controller 37 can instruct the pump 11 to lower its speed so as to reduce the temperature of the solution to at or below the predetermined maximum temperature.

In addition to finding the operational speed of the pump 11 that will enable the solution flowing through the dispensing system 10 to be below the predetermined maximum temperature, the operating speed of the pump 11 can also be adjusted to account for other factors. In particular, as described above, the solution flowing through the dispensing system 10, and thus the hot melt adhesive foam ultimately dispensed from the dispenser 28, can have a particular gas content. During or after the adjustment of the operational speed of the pump 11 as described above in response to the temperature of the solution, the HMI device 41 can be configured to produce a notification that requests inspection of the hot melt adhesive foam dispensed from the dispenser 28. Though visual inspection in particular can be used, it is contemplated that other methods or devices for determining the quality of the solution and/or the hot melt adhesive foam can be utilized.

Upon inspecting the hot melt adhesive foam, the operator can determine whether the quality of the hot melt adhesive foam is optimal. In particular, the dispensing system 10 can dispense a bead of hot melt adhesive foam, which the operator can cut open and inspect. If the foam quality is suboptimal, it can be due to the speed of the pump 11 being too high relative to the amount of gas being provided to the pump 11. As a result, if the operator determines that the quality of the hot melt adhesive foam is not optimal, the operator can provide an input to the HMI device 41 indicating that the gas content of the hot melt adhesive foam is below a desired level. Accordingly, the controller 37 can instruct the pump 11 to decrease its operational speed. In a situation where the pump 11 has already decreased its operational speed to a second speed in response to the temperature of the solution, the controller 37 can be configured to instruct the pump 11 to operate at a third speed that is less than the second speed in response to the input. When transitioning to the third speed from the second speed, the controller 37 can instruct the pump 11 to decrease its speed in a set increment as described above. This assessment and feedback process for the quality of the hot melt adhesive foam can continue until the operator is satisfied with the quality of the hot melt adhesive, and thus the amount of gas comprising the solution. In response to the production of high-quality foam, the operator can provide an input to the HMI device 41 indicating that the gas content of the solution is at a desired level. Further, though described as occurring after adjusting the speed of the pump 11 in response to the temperature of the solution, adjusting the speed of the pump 11 in response to the gas content of the solution can occur before or simultaneously with the adjustments due to solution temperature.

In addition to the controller 37 determining an adjustment to the operation of the pump 11 in response to an operator input regarding the gas content of the solution or a sensed temperature of the solution, the controller 37 can adjust operation of the pump 11 when the HMI device 41 receives an input that instructs the pump 11 to operate at a specific speed. For example, when the controller 31 has already adjusted the speed of the pump 11 from a first speed to a second speed, the HMI device 41 can be configured to receive an input that instructs the pump 11 to operate at a third speed that is different than the first and second speeds.

The operator can control the pump 11 in this way when the operator wants to set the pump 11 at a specific speed due to industry experience, or due to knowledge from previously-performed testing.

Now referring to FIGS. 14-17, a method 200 of dispensing hot melt adhesive foam onto a substrate will be described. The method can include step 202, which includes receiving the hot melt adhesive from the hot melt adhesive source 17. Method 200 can also include step 206, which includes receiving the gas from the gas source 22. In practice, steps 202 and 206 can begin simultaneously, or in any desired order. Once the pump 11 receives the hot melt adhesive and the gas, step 210 can be performed. In step 210, the hot melt adhesive and the gas can be mixed by the pump 11 to produce the solution. After mixing the hot melt adhesive and the gas to form the solution, step 214 can be performed, which includes pumping the solution from the pump 11 to the dispenser 28. In step 214, the pump 11 can operate at a first speed, which in one embodiment can comprise the maximum speed of the pump 11. Then, in step 218, the dispenser 28 can dispense the solution to produce the hot melt adhesive foam.

Continuing with FIG. 15, in one embodiment the first speed of the pump 11 is a higher speed, and potentially the maximum speed of the pump 11. In such embodiments, once the dispenser 28 begins dispensing the solution in step 218, in step 220 the temperature sensor 56 can detect a temperature of the solution. As described above, the temperature sensor 56 can be adjacent an outlet 26 of the second stage 13 of the pump 11. Upon sensing the temperature of the solution, the temperature sensor 56 can transmit a signal to the controller 37 via the signal connection 38d that is indicative of the temperature of the solution. Then, in step 222, the controller 37 can determine whether the temperature of the solution is above a predetermined maximum temperature. As stated above, the predetermined maximum temperature can be about 2020 Celsius. However, it is contemplated that the predetermined maximum temperature can be from about 1850 Celsius to about 210° Celsius.

When the controller 37 determines that the temperature is above the predetermined maximum temperature, in step 230 the controller 37 can be configured to instruct the pump 11 to adjust its operational speed from a first speed to a second speed that is different than the first speed. In step 230, adjusting the operational speed comprises decreasing the operational speed from the first speed to the second speed. As stated above, the controller 37 can instruct the pump 11 to decrease its speed in a set increment. The increments can be 10 RPM, though other increments in speed decreases can be utilized, such as 1% of the maximum speed of the pump 11. Alternatively, if the controller 37 determines that the temperature of the solution is equal to, or within a predetermined tolerance of, the predetermined temperature, then the controller 37 can be configured to instruct the pump 11 to maintain its speed at the first speed in step 226. The controller 37 can be configured to repeat steps 220, 222, and 230 until the temperature of the solution is less than or equal to, or within a predetermined tolerance of, the predetermined maximum temperature and step 226 is performed. For example, the controller 37 can instruct the pump 11 to decrease its operational speed from the second speed to a third speed.

Figure 16:
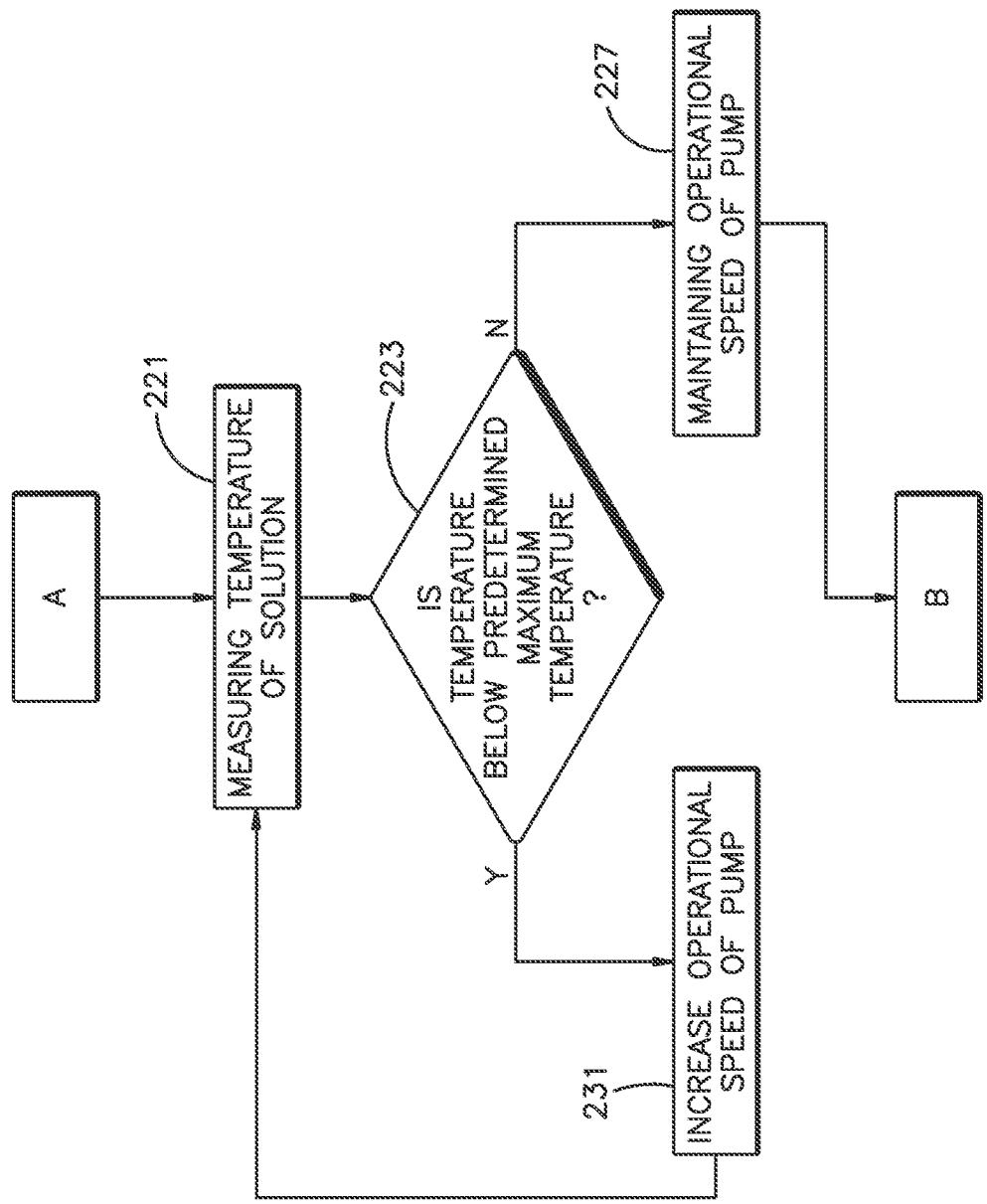
FIG. 16 illustrates a second alternative continued process flow diagram of the method shown in FIG. 14.

Alternatively, continuing with FIG. 16, in one embodiment the first speed of the pump 11 is a lower speed. In such embodiments, once the dispenser 28 begins dispensing the solution in step 218, in step 221 the temperature sensor 56 can detect a temperature of the solution. Upon sensing the temperature of the solution, the temperature sensor 56 can transmit a signal to the controller 37 via the signal connection 38d that is indicative of the temperature of the solution. Then, in step 223, the controller 37 can determine whether the temperature of the solution is below a predetermined maximum temperature. As stated above, the predetermined maximum temperature can be about 202° Celsius. However, it is contemplated that the predetermined maximum temperature can be from about 185° Celsius to about 210° Celsius.

When the controller 37 determines that the temperature is below the predetermined maximum temperature, in step 231 the controller 37 can be configured to instruct the pump 11 to adjust its operational speed from a first speed to a second speed that is different than the first speed. In step 231, adjusting the operational speed comprises increasing the operational speed from the first speed to the second speed. As stated above, the controller 37 can instruct the pump 11 to increase its speed in a set increment. The increments can be 10 RPM, though other increments in speed decreases can be utilized, such as 1% of the maximum speed of the pump 11. Alternatively, if the controller 37 determines that the temperature of the solution is equal to, or within a predetermined tolerance of, the predetermined maximum temperature, then the controller 37 can be configured to instruct the pump 11 to maintain its speed at the first speed in step 227. The controller 37 can be configured to repeat steps 221, 223, and 231 until the temperature of the solution is equal to, or within a predetermined tolerance of, the predetermined maximum temperature and step 227 is performed. For example, the controller 37 can instruct the pump 11 to increase its operational speed from the second speed to a third speed.

Figure 17:
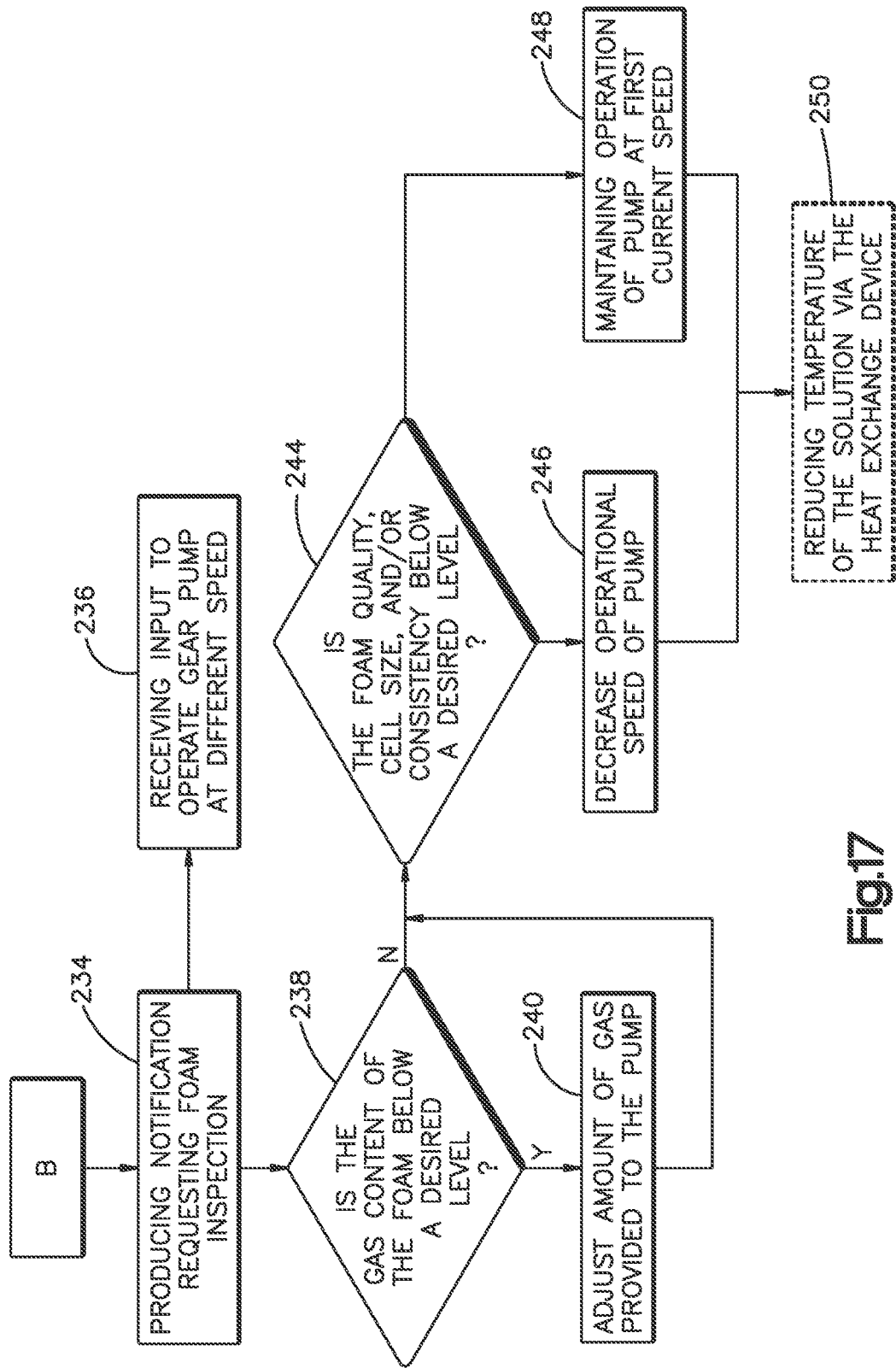
FIG. 17 illustrates a continued process flow diagram of the method shown in FIGS. 14-16.

Continuing with FIG. 17, the method 200 can also include step 234 in which the HMI device 41 is configured to produce a notification that requests inspection of the hot melt adhesive foam dispensed by the dispenser 28. Based upon a visual inspection, the operator of the dispensing system 10 can determine in step 238 whether the gas content of the hot melt adhesive foam is lower than desired. When the operator determines the gas content of the hot melt adhesive foam is too low, the controller 37 can adjust an amount of gas output by the valve 24 to the pump 11 in step 240. One method of implementing step 240 is discussed below in relation to FIG. 18. Additionally, or alternatively, based on the visual inspection, the operator can determine in step 244 whether one or more, up to all, of a foam quality, a cell size, and a consistency is below a desired level. If one or more, up to all, of a foam quality, a cell size, and a consistency is below a desired level, then the controller 37 can decrease the operational speed of the pump 11 in step 246. If, instead, the foam quality, cell size, and consistency are at a desired level, then the controller 37 can instruct the pump 11 to continue operating at its current speed in step 248. Typically, smaller cells correspond to higher quality than larger cells. The controller 37 can be configured to repeat steps 234, 238, 240, 244, 246, and 248 until the operator determines that the gas content, foam quality, cell size, and consistency of the hot melt adhesive foam are acceptable.

The method may additionally, or alternatively, comprise a step 236, wherein the controller 37 can receive an input from the HMI device 41 that instructs the pump 11 to operate at certain speed, for example a third speed that is different than the first and second speeds. As previously described, the operator can control the pump 11 in this way when the operator wants to set the pump 11 at a specific speed due to industry experience, or due to knowledge from previously-performed testing. Optionally, the method can comprise a step 250 in which the dispensing system 10 selectively reduces the temperature of the solution exiting the pump 11 via a heat exchange device 57. This can allow the dispensing system 10 to produce lower temperature solution without reducing the speed of the pump 11.

Figure 18:
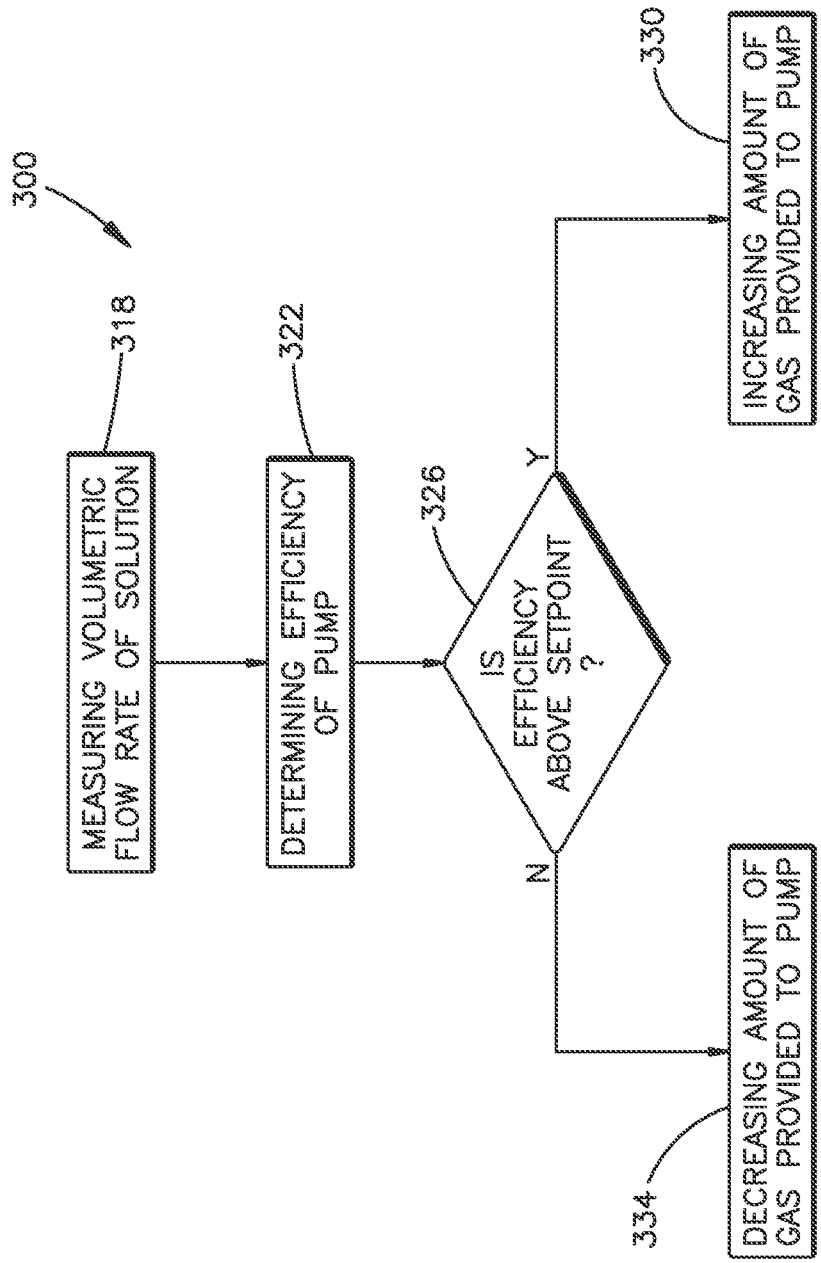
FIG. 18 illustrates a process flow diagram of a method of dispensing hot melt adhesive foam onto a substrate according to an embodiment of the present disclosure.

Turning now to FIG. 18, a method of performing step 240 to adjust the amount of gas provided by the valve 24 to the pump 11 will now be discussed. In one example, the amount of gas can be adjusted based on efficiency of the pump 11, which can be determined based on the volumetric flow rate of the solution as measured by the flow meter 100. The efficiency of the pump 11 can be utilized as a target parameter to be maintained throughout operation of the dispensing system 10, as the efficiency can be relatively unaffected by the speed of the pump 11, as well as the viscosity and temperature of the solution, all of which may be adjusted or change throughout the operation of the dispensing system 10. As such, after determining the efficiency of the pump 11 when the hot melt adhesive foam quality is optimal, the controller 37 can adjust aspects of the dispensing system 10 to maintain this desired efficiency level throughout a particular dispensing operation.

In one embodiment, the controller 37 is configured to receive a signal from the flow meter 100 that is indicative of the volumetric flow rate of the solution pumped by the pump 11. Using this signal, the controller 37 can determine the efficiency of the pump 11 based on the volumetric flow rate. The controller can be configured to determine the efficiency of the pump 11 to be equal to or proportional to Equation (1):

$$\frac{AFR}{RPM*DPR} \tag{1}$$

where:
AFR is the actual volumetric flow rate measured by the flow meter 100;
RPM is the revolutions per minute (RPM) at which the pump 11 is operating; and
DPR is the volumetric displacement per revolution of the pump 11.

While the AFR can be measured by the flow meter 100, the RPM of the pump 11 can be received by the controller 37 through the signal connection 38c that connects the pump 11 with the controller 37, or can be input into the controller 37 by the operator of the dispensing system 10 in order to control the pump 11. Additionally, the DPR can be a known variable that corresponds to the particular pump 11 utilized within the dispensing system 10, and can similarly be received by the controller 37 from the pump 11 through the signal connection 38c or can be input into the controller 37 by the operator. The RPM of the pump 11 multiplied by the DPR of the pump 11 can also be referred to as the theoretical volumetric flow rate of the pump 11. As such, the efficiency of the pump 11 can be calculated to be equal to or proportional to Equation (1) by dividing the actual volumetric flow rate by the theoretical volumetric flow rate.

In operation, the operator of the dispensing system 10 can adjust the speed of the pump 11 as described above until the dispensing system 10 produces hot melt adhesive foam that is optimal for a particular dispensing operation. At this point, the controller 37 can calculate the efficiency of the pump 11. This efficiency can be referred to as a predetermined setpoint for the efficiency of the pump 11, as it represents the efficiency that the pump 11 must maintain in order to maintain the hot melt adhesive foam at the desired quality. Over time, however, the efficiency of the pump 11 may increase or decrease based upon many factors within the dispensing system 10. As such, the controller 37 must be able to take corrective action in order to maintain efficiency of the pump 11 at the predetermined setpoint.

One method of affecting the efficiency of the pump is to adjust the gas content of the solution. When the gas content of the solution increases, the efficiency of the pump 11 decreases because the pressure regulator 31 may be configured to control the pressure within the second recirculation channel 29 to be substantially equal to the atmospheric pressure. As a result, a substantial amount of the gas comprising the solution will become unmixed from the solution after passing through the pressure regulator 31 and consequently form bubbles within the solution, where the bubbles can reduce the efficiency of the pump 11. As a result, the more gas the solution contains, the lower the efficiency of the pump 11 can be. Likewise, when the gas content of the solution decreases, the efficiency of the pump 11 increases. In one embodiment, the gas valve 24 can be selectively opened and closed to allow amounts of gas to flow to the pump 11. The gas valve 24 can be opened for discrete intervals over a set period of time, where the set period of time can be referred to as the duty cycle of the gas valve 24. The duty cycle can be from about 10-100 milliseconds, though other duty cycles are contemplated. The controller 37 can control the percentage of the duty cycle that the gas valve 24 is open and closed so as to adjust the amount of gas provided to the pump 11, and thus adjust the efficiency of the pump 11. In another embodiment, the gas valve 24 can be configured to be transitioned between more positions than simply open and closed. For example, it is contemplated that the gas valve 24 can allow any percent between 0% and 100% of the gas flow received from the gas source 22 through to the second input 10b of the pump 11. As a result, the gas content of the solution can be controlled by controlling the percentage that the gas valve 24 is opened, After the predetermined setpoint has been set, the controller 37 can be configured to instruct the gas valve 24 to decrease an amount of gas provided to the pump when the efficiency is below the predetermined setpoint. This decrease can be performed according to a proportional-integral-derivative (PID) control algorithm. Alternatively, this decrease can be performed according to a proportional control algorithm. The amount of gas provided can be decreased until the efficiency is equal to, or just below (such as within a predetermined amount below), the predetermined setpoint. When the gas content of the solution decreases, the efficiency of the pump 11 can increase.

Likewise, the controller 37 can be configured to instruct the gas valve 24 to increase the amount of gas provided to the pump 11 when the efficiency is above the predetermined setpoint. As with the decrease in gas content, this increase can be performed according to a PID control algorithm. Alternatively, this increase can be performed according to a proportional control algorithm. The amount of gas provided can be increased until the efficiency is equal to, or just below (such as within a predetermined amount below), the predetermined setpoint. When the gas content of the solution increases, the efficiency of the pump 11 can decrease. Each of these above-described changes to the percentage of the duty cycle that the gas valve 24 is open and closed may not occur only when the efficiency of the pump 11 deviates from the exact predetermined setpoint. For example, the controller 37 may only instruct the gas valve 24 to increase or decrease the percentage of the duty cycle that the gas valve 24 is open and closed when the efficiency of the pump 11 as calculated by the controller 37 deviates from the predetermined setpoint by a certain percentage, where the percentage can be determined by the controller 37 based upon the particular dispensing operation being performed or input into the controller 37 by the operator of the dispensing system 10 via the HMI device 41.

During a dispensing operation, it may become necessary to change the predetermined setpoint so as to adjust the efficiency of the pump 11, and thus adjust the characteristics of the hot melt adhesive foam produced by the dispensing system 10. To do this, the operator of the dispensing system 10 can provide at least one user input to the HMI device 41 that adjusts the predetermined setpoint. The controller 37 can then instruct the gas valve 24 as described above so as to change the gas content of the solution and cause the pump 11 to operate at the desired efficiency.

The at least one user input may include, for example, foam density (e.g., lb/cu ft or kg/L), percent density reduction (% DR), solid volume fraction (e.g., solid volume/total volume), or gas volume fraction (e.g., gas volume/total volume). Percent density reduction has been shown to have a relatively linear relationship with efficiency up to a maximum density reduction (e.g., 60%-80%), where the adhesive won't retain any more gas. Thus, in the linear region, an increase in percent density reduction generally results in a corresponding decrease in efficiency, while a decrease in percent density reduction generally results in a corresponding increase in efficiency. This relationship is generally true for different adhesives, although the slope and intercept of the linear relation may vary based on the composition of the adhesive. It will be understood that the user can determine the user inputs above by direct measurement and calculation, or the user inputs can be selected from a set of predetermined values. The predetermined values, such as the efficiency, density, percent density reduction, solid volume fraction, gas volume fraction, and curve of any of these values relative to efficiency can be stored, for example, in a database, a library, or in another suitable location.

Now referring to FIG. 18, the method 300 can a step 318 of measuring the volumetric flow rate of the solution via the flow meter 100 while the solution is being pumped by the pump 11. The flow meter 100 can transmit a signal that is indicative of the volumetric flow rate to the controller 37 through the signal connection 38a. Once the volumetric flow rate of the solution is measured in step 318, in step 322 the efficiency of the pump 11 can be determined by the controller 37. In one embodiment, the efficiency of the pump 11 can be determined according to Equation (1), as described above, using the volumetric flow rate of the solution as measured by the flow meter 100. Once the efficiency of the pump 11 is determined, the controller 37 can determine whether the efficiency is above or below a predetermined setpoint in step 326. The predetermined setpoint can be recalled by the controller 37 from the memory 40 based upon a particular dispensing operation to be performed, speed of the pump 11, etc. Additionally, the operator of the dispensing system 10 can provide a user input to the HMI device 41 that sets the predetermined setpoint. The predetermined setpoint can comprise a discrete value, or a percentage deviation from a discrete value, where the particular percentage can be determined by the controller 37 or selected by the operator through the HMI device 41.

If the controller 37 determines that the efficiency of the pump 11 is above the predetermined setpoint, step 330 is performed. In step 330, the controller 37 can instruct the gas valve 24 to increase the percentage of the duty cycle that the gas valve 24 is open, thus increasing the amount of gas provided to the pump 11. As such, the gas content of the solution produced by the pump 11 will increase, and the efficiency of the pump 11 will likewise decrease. Alternatively, if the controller 37 determines that the efficiency of the pump 11 is below the predetermined setpoint, step 334 is performed. In step 334, the controller 37 can instruct the gas valve 24 to decrease the percentage of the duty cycle that the gas valve 24 is open, thus decreasing the amount of gas provided to the pump 11. As such, the gas content of the solution produced by the pump 11 will decrease, and the efficiency of the pump 11 will likewise increase.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions-such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features, and concepts may be expressly identified herein as being inventive or forming part of an invention, such identification is not intended to be exclusive, but rather there may be inventive aspects, concepts, and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated. For instance, although the steps of the methods are described with reference to sequential series of reference signs and progression of the blocks in the figures, the method can be implemented in a particular order as desired.

What is claimed is:

1. A dispensing system to dispense a hot melt adhesive foam onto a substrate, the dispensing system comprising:
   a pump having a first input configured to receive a hot melt adhesive and a second input configured to receive a gas, wherein the pump is configured to mix the hot melt adhesive and the gas to produce a solution;
   a temperature sensor configured to detect a temperature of the solution;

a dispenser configured to receive the solution from the pump and dispense the solution to create the hot melt adhesive foam; and a controller in signal communication with the temperature sensor and the pump, wherein the controller is configured to 1) instruct the pump to operate at a first speed; 2) receive a signal from the temperature sensor that is indicative of the temperature of the solution; and 3) instruct the pump to operate at a second speed that is different than the first speed in response to the signal.

2. The dispensing system of claim 1, wherein the controller is further configured to determine whether the temperature is above a predetermined maximum temperature, and instruct the pump to operate at the second speed that is less than the first speed when the temperature is above the predetermined maximum temperature.

3. The dispensing system of claim 2, wherein the controller is further configured to instruct the pump to maintain operation at the first speed when the temperature is below the predetermined maximum temperature.

4. The dispensing system of claim 3, wherein the predetermined maximum temperature is about 202° Celsius.

5. The dispensing system of claim 1, wherein the controller is further configured to determine whether the temperature is below a predetermined maximum temperature, and instruct the pump to operate at the second speed that is greater the first speed when the temperature is below the predetermined maximum temperature.

6. The dispensing system of claim 5, wherein the controller is further configured to instruct the pump to operate at the first speed when the temperature is above the predetermined maximum temperature and the pump operates at the second speed.

7. The dispensing system of claim 1, wherein the controller includes a human-machine interface (HMI) device, wherein the HMI device is configured to produce a notification that requests inspection of the hot melt adhesive foam.

8. The dispensing system of claim 7, wherein the HMI device is configured to receive an input that instructs the pump to operate at a third speed that is different than the first and second speeds.

9. The dispensing system of claim 7, wherein the HMI device is configured to receive an input indicating that a gas content of the hot melt adhesive foam is below a desired level.

10. The dispensing system of claim 9, wherein the controller is configured to instruct the pump to operate at a third speed that is less than the second speed in response to the input.

11. The dispensing system of claim 1, wherein the temperature sensor is positioned adjacent an outlet of the pump.

12. The dispensing system of claim 1, wherein the first speed of the pump is a maximum speed of the pump.

13. The dispensing system of claim 12, wherein the maximum speed is about 1000 revolutions per minute.

14. A dispensing system to dispense a hot melt adhesive foam onto a substrate, the dispensing system comprising:

a pump having a first input configured to receive a hot melt adhesive and a second input configured to receive a gas, wherein the pump is configured to mix the hot melt adhesive and the gas to produce a solution;

a temperature sensor configured to detect a temperature of the solution;

a dispenser configured to receive the solution from the pump and dispense the solution to create the hot melt adhesive foam;

a controller in signal communication with the temperature sensor and the pump, wherein the controller is configured to 1) instruct the pump to operate at a first speed; 2) receive a signal from the temperature sensor that is indicative of the temperature of the solution; and 3) instruct the pump to operate at a second speed that is different than the first speed in response to the signal;

a recirculation channel configured to selectively direct the solution from the dispenser to an input of the pump;

a pressure regulator for controlling a pressure of the solution flowing through the recirculation channel;

an electro-pneumatic transducer configured to selectively actuate the pressure regulator;

a pressure sensor configured to measure the pressure of the solution flowing through the recirculation channel; and a proportional-integral-derivative controller configured to receive a signal from the pressure sensor indicative of the pressure and instruct the electro-pneumatic transducer to actuate the pressure regulator based on the pressure.

15. A method of dispensing hot melt adhesive foam onto a substrate, comprising:

receiving a hot melt adhesive from a hot melt adhesive source;

receiving a gas from a gas source;

mixing the hot melt adhesive and the gas to produce a solution;

pumping the solution from a pump operating at a first speed to a dispenser;

dispensing the solution from the dispenser to produce the hot melt adhesive foam;

measuring, by a temperature sensor, a temperature of the solution; and adjusting, by a controller, an operational speed of the pump from the first speed to a second speed that is different than the first speed in response to the measuring of the temperature of the solution.

16. The method of claim 15, further comprising:

determining whether the temperature is above a predetermined maximum temperature, wherein adjusting the operational speed of the pump comprises decreasing the operational speed from the first speed to the second speed when the temperature is above the predetermined maximum temperature.

17. The method of claim 15, further comprising:

determining whether the temperature is below a predetermined maximum temperature, wherein adjusting the operational speed of the pump comprises increasing the operational speed from the first speed to the second speed when the temperature is below the predetermined maximum temperature.

18. The method of claim 15, further comprising:

producing a notification that requests inspection of the hot melt adhesive foam.

19. The method of claim 18, further comprising:

receiving an input that instructs the pump to operate at a third speed that is different than the first speed and the second speed.

20. The method of claim 15, wherein the temperature sensor is positioned adjacent an outlet of the pump.

* * * * *